US008790776B2

(12) United States Patent
Zeller

(10) Patent No.: US 8,790,776 B2
(45) Date of Patent: Jul. 29, 2014

(54) ENERGY ABSORBING SYSTEM FOR VEHICLES

(75) Inventor: Frank Zeller, Austin, TX (US)

(73) Assignee: Texas Research International, Inc., Austin, TX (US)

( * ) Notice: Subject to any disclaimer, the term of this patent is extended or adjusted under 35 U.S.C. 154(b) by 480 days.

(21) Appl. No.: 12/979,892

(22) Filed: Dec. 28, 2010

(65) Prior Publication Data

US 2011/0277298 A1    Nov. 17, 2011

Related U.S. Application Data

(60) Provisional application No. 61/291,539, filed on Dec. 31, 2009.

(51) Int. Cl.
  *B32B 7/12*    (2006.01)
(52) U.S. Cl.
  USPC ............ 428/343; 29/527.1; 296/187.03
(58) Field of Classification Search
  USPC ............ 29/527.1; 296/187.03, 184.1, 203.01, 296/204, 205; 428/343
  See application file for complete search history.

(56) References Cited

U.S. PATENT DOCUMENTS

| | | | | |
|---|---|---|---|---|
| 5,081,162 | A | * | 1/1992 | Farkas et al. .................. 521/133 |
| 6,758,507 | B2 | * | 7/2004 | Tarahomi et al. ............. 293/120 |
| 7,175,230 | B2 | * | 2/2007 | Wycech .................... 296/187.03 |
| 2006/0110608 | A1 | * | 5/2006 | Azumi et al. ................. 428/441 |
| 2006/0223967 | A1 | * | 10/2006 | Conner ........................... 528/44 |
| 2007/0042828 | A1 | | 2/2007 | Krushke, Jr. et al. |
| 2007/0114812 | A1 | | 5/2007 | Hunt |
| 2008/0042471 | A1 | | 2/2008 | Kirn et al. |
| 2009/0090236 | A1 | | 4/2009 | Misencik et al. |

FOREIGN PATENT DOCUMENTS

| EP | EP 1 707 584 A1 | 4/2006 |
|---|---|---|
| WO | 2006037026 A2 | 4/2006 |

OTHER PUBLICATIONS

Polyurea Sysytems, New Coatings Technology Expands Usage by A. Perz, Jr. et al. Modern Paint Coaings, pp. 26-29,, Nov. 2000.*
European Paent Office Notification of Transmittal of the International Search Report and the Written Opinion of the International Searching Authority, Applicaton No. PCT/US2010/062237, Apr. 6, 2011.
Ralston, Dan Advantages of a thermoplastic bumper Energy Absorber in a world without a 5 mph bumper requirement (Abstract) SAE World Congress & Exhibition, Apr. 2009 Document No. 2009-01-0963.
Carley, Michael Advancements in Expanded Polypropylene Foam Energy Management for Bumper Systems (Abstract) SAE World Congress & Exhbition, Mar. 2004 Document No. 2004-01-1700.
Coatings of Polymers and Plastics (Materials Engineering, 21): Chapter 1. Rose A. Ryntz (Editor), Philip V. Yaneff (Editor) Feb. 4, 2003.
Bahei-El-Din, Yehia et al. A blast-tolerant sandwich plate design with a polyurea interlayer International Journal of Solids and Structures 43:25-26, pp. 7644-7658, Dec. 2006.
Panduranga, Raghu et al. Energy absorption performance of a Eco-Core—a syntactic foam (Abstract) 48th AIAA/ASME/ASCE/AHS/ASC Structures, Structural Dynamics, and Materials Conference, Apr. 23, 2007-Apr. 26, 2007.
U.S. Department of Transportation, National Highway Traffic Safety Administration Laboratory Test Procedure for FMVSS 201: Occupant Protection in Interior Impact, TP-201-02, updated Mar. 3, 1989.
U.S. Department of Transportation, National Highway Traffic Safety Administration Laboratory Test Procedure for FMVSS 302: Flammability of Interior Materials, TP-302-03, updated Oct. 18, 1991.
Coatings of Polymers and Plastics (Materials Engineering, 21): Chapter 5. Rose A. Ryntz (Editor), Philip V. Yaneff (Editor) Feb. 4, 2003.

* cited by examiner

*Primary Examiner* — Carl Arbes
(74) *Attorney, Agent, or Firm* — Jackson Walker L.L.P.

(57) ABSTRACT

The present invention relates to an energy absorbing composition comprising a core material and an appliqué material. The energy absorbing material may include a core material, such as an aluminum honeycomb or expanded polypropylene (EPP). The energy absorbing material may further comprise a protective material, which is applied to the core material to enhance durability of the energy absorbing material and increase the energy absorbing characteristics of the core The protective material may comprise external polyurethane, polyurea, or other suitable skin forming material and the protective material may be applied to the core material using any viable technique, including spraying or painting. The energy absorbing material of the present invention can withstand multiple impacts without significant loss to its energy absorbing qualities. The energy absorbing system meets or exceeds FMVSS 302 flammability specifications.

18 Claims, 33 Drawing Sheets

FIGURE 2 TEST #FH9354

FIGURE 3 TEST #FH9354

FIGURE 4 TEST #FH9354

FIGURE 5 TEST #FH9354

FIGURE 6 TEST #FH9354

FIGURE 7 TEST #FH9354

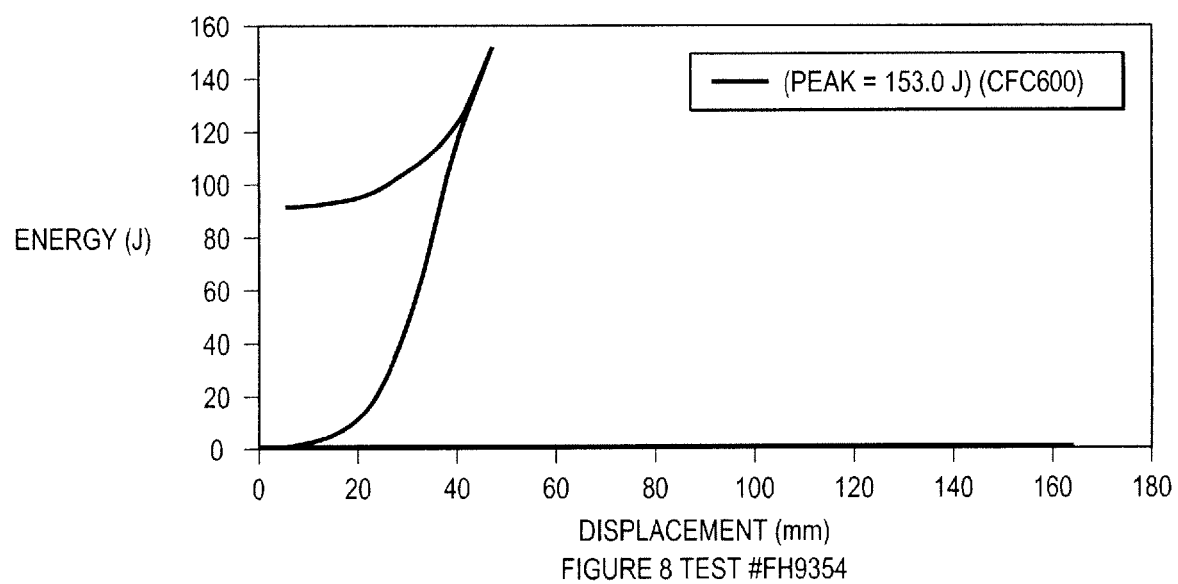

FIGURE 9 TEST #FH9355

FIGURE 10 TEST #FH9355

FIGURE 11 TEST #FH9355

FIGURE 12 TEST #FH9355

FIGURE 13 TEST #FH9355

FIGURE 14 TEST #FH9355

FIGURE 15 TEST #FH9355

FIGURE 16 TEST #FH9356

FIGURE 17 TEST #FH9356

FIGURE 18 TEST #FH9356

FIGURE 19 TEST #FH9356

FIGURE 20 TEST #FH9356

FIGURE 21 TEST #FH9356

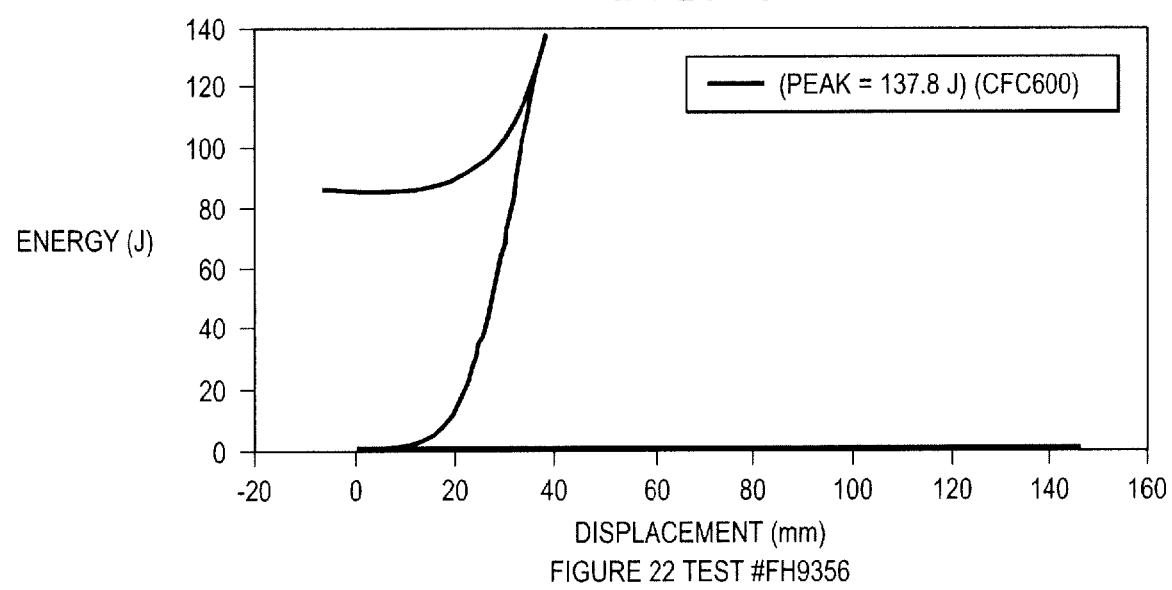

FIGURE 23 TEST #FH9357

FIGURE 24 TEST #FH9357

FIGURE 25 TEST #FH9357

FIGURE 26 TEST #FH9357

FIGURE 27 TEST #FH9357

FIGURE 28 TEST #FH9357

FIGURE 29 TEST #FH9357

FIGURE 30 TEST #FH9358

FIGURE 31 TEST #FH9358

FIGURE 32 TEST #FH9358

FIGURE 33 TEST #FH9358

FIGURE 34 TEST #FH9358

FIGURE 35 TEST #FH9358

FIGURE 36 TEST #FH9358

TEST #MA8853-I PRE-TEST PHOTOGRAPH

TEST #MA8853-I POST-TEST PHOTOGRAPH

APPROXIMATE FREE MOTION HEADFORM IMPACT ORIENTATION
HEADFORM IS ALLOWED TO ROTATE FREELY AS IT HITS THE IMPACTING SURFACE

ACCELERATION VERSUS TIME FOR TRI HONEYCOMB WITH POLYUREA TOP COATING

US 8,790,776 B2

ENERGY ABSORBING SYSTEM FOR VEHICLES

This application claims priority to U.S. Provisional Patent Application Ser. No. 61/291,539, filed on Dec. 31, 2009, entitled ENERGY ABSORBING SYSTEM FOR VEHICLES, the entire content of which is hereby incorporated by reference.

STATEMENT OF RIGHTS TO INVENTIONS MADE UNDER FEDERALLY SPONSORED RESEARCH

This invention was made with government support under Grant Number W56 HZV-08-C-0047 awarded by the US Army TACOM LCMC. The government has certain rights in the invention.

FIELD OF THE INVENTION

The present invention relates generally to the field of energy absorbing material systems, and more specifically to an energy absorbing material composite comprising of a core energy absorbing substrate, in conjunction with a protective outer elastomeric coating, and materials for use in tactical vehicles.

BACKGROUND

Military tactical vehicles are exposed to collisions, rollovers, and resultant secondary impact effects of mine blast or improvised explosive devices (IED's). Therefore, tactical vehicles are often heavily armored on both the exterior and interior of the vehicle.

Materials used for occupant energy absorbing must have several characteristics in order to sufficiently protect occupants from suffering bodily injury and head trauma. They must be somewhat flexible in order to avoid causing injuries due to collisions between occupants and the energy absorbing panels themselves. They must be lightweight to avoid increasing the total vehicle weight and fuel requirements beyond an acceptable point. They must be easily produced in sufficient quantities so as not to increase cost beyond acceptable levels, and they must be durable to avoid frequent need for replacement. The materials must also be able to absorb the energy from multiple impact events imparted by occupants.

In recent years, the armor level of tactical vehicle body panels has increased significantly, and this increase has been achieved using material which is increasingly stiff. However, rigid material can cause increased injury to soldiers during a collision, a flexible and compressible impact energy absorbing material is more desirable.

SUMMARY

The present invention relates to an energy absorbing composite material system comprising a core material with an energy absorbing elastomeric top coating material. The energy absorbing material may include a core material, such as an aluminum honeycomb, polyurethane foam or expanded polypropylene. The energy absorbing material may further comprise a protective material which is applied to the core material to enhance durability of the energy absorbing material and increase energy absorbing properties. The protective material may comprise an external polyurethane, polyurea, or other suitable skin forming material, and the protective material may be applied to the core material using any viable technique, including spraying, rolling, or painting, the coating.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 11 shows energy plotted against displacement for Test FH9354, in an embodiment of the present invention;

FIG. 19 shows energy plotted against displacement for Test FH9356, in an embodiment of the present invention;

DETAILED DESCRIPTION

Figure 1:
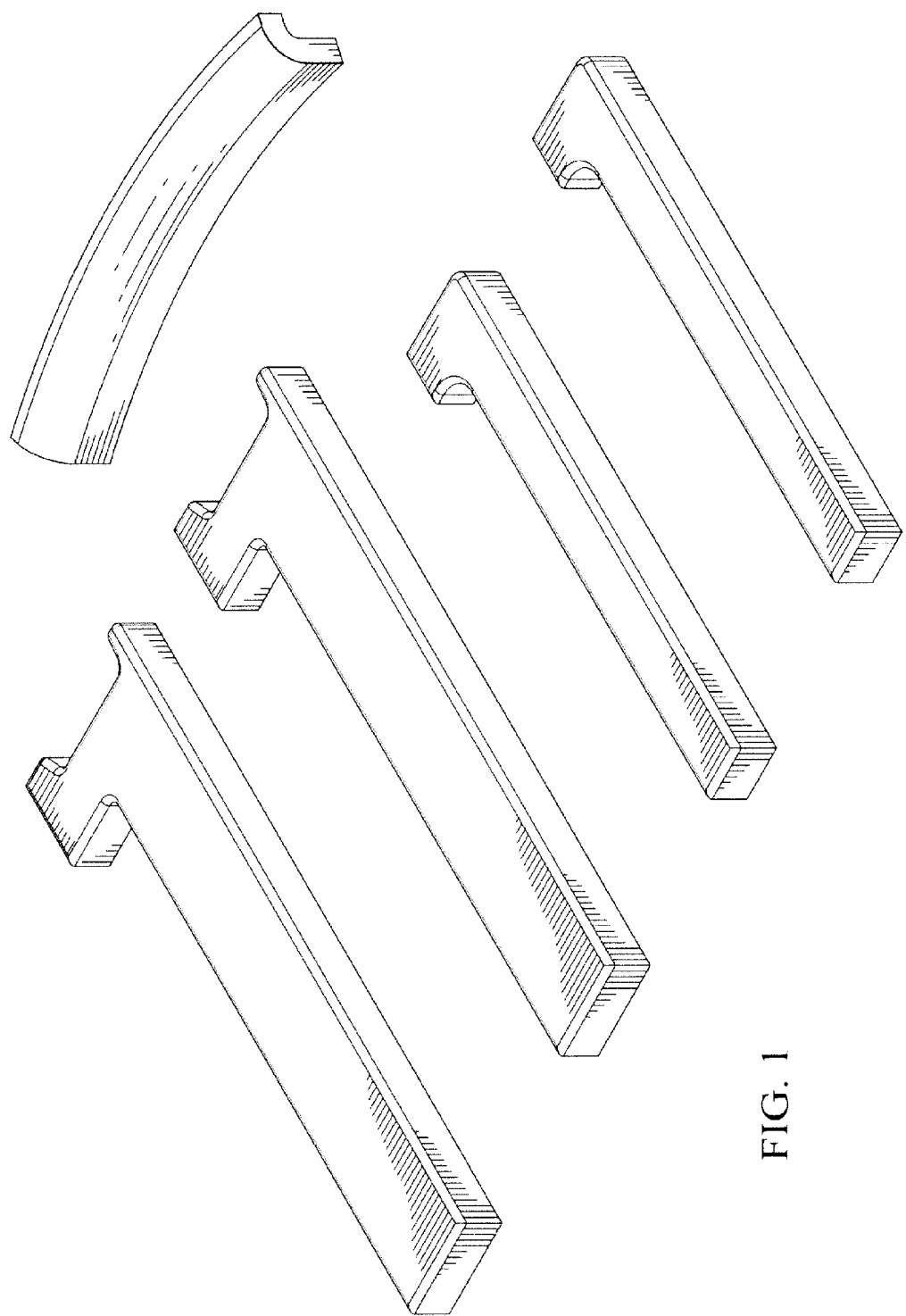
FIG. 1 shows energy absorbing panels in accordance with an embodiment of the present invention.
Figure 2:
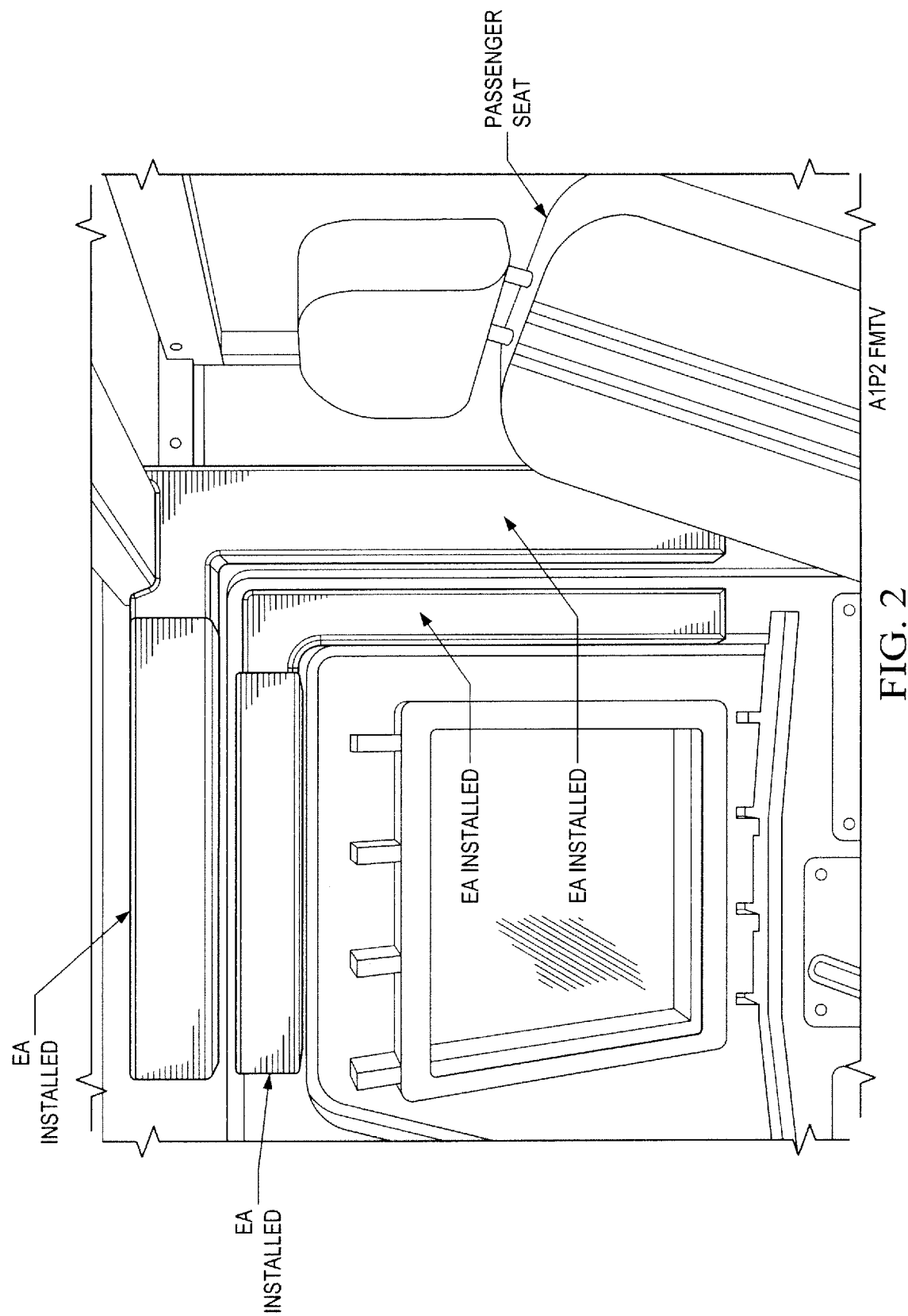
FIG. 2 shows a passenger side door, the upper door, and a B pillar, fitted with an energy absorbing material in accordance with an embodiment of the present invention.
Figure 3:
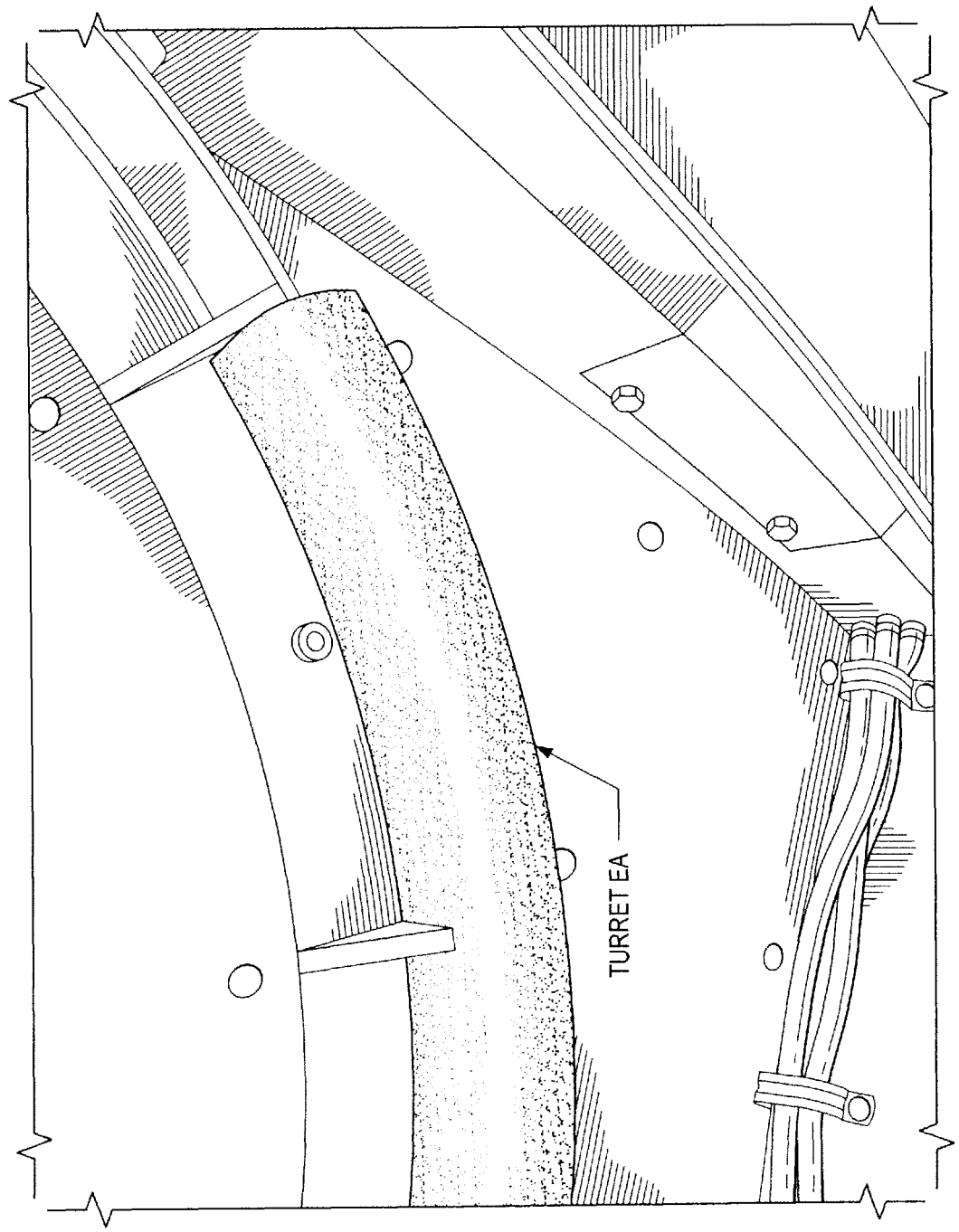
FIG. 3 shows a gun turret fitted with an energy absorbing material in accordance with an embodiment of the present invention.
Figure 4:
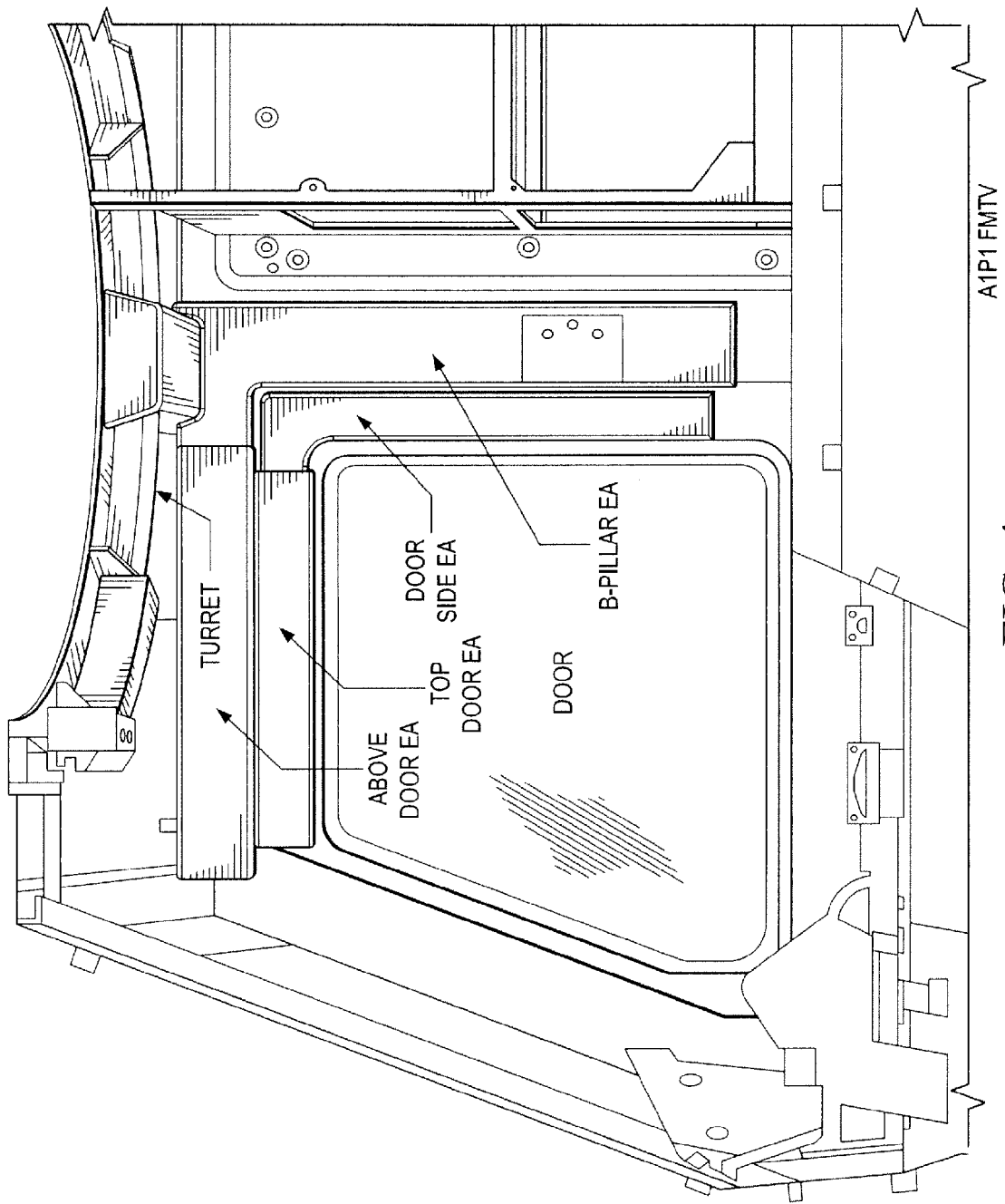
FIG. 4 shows possible locations for energy absorbing material on a B pillar rear side of door and gun turret of a tactical vehicle in accordance with an embodiment of the present invention. Placement of energy absorbing material may be determined by occupant movement from blast, collision and vehicle rollover events.
Figure 5:
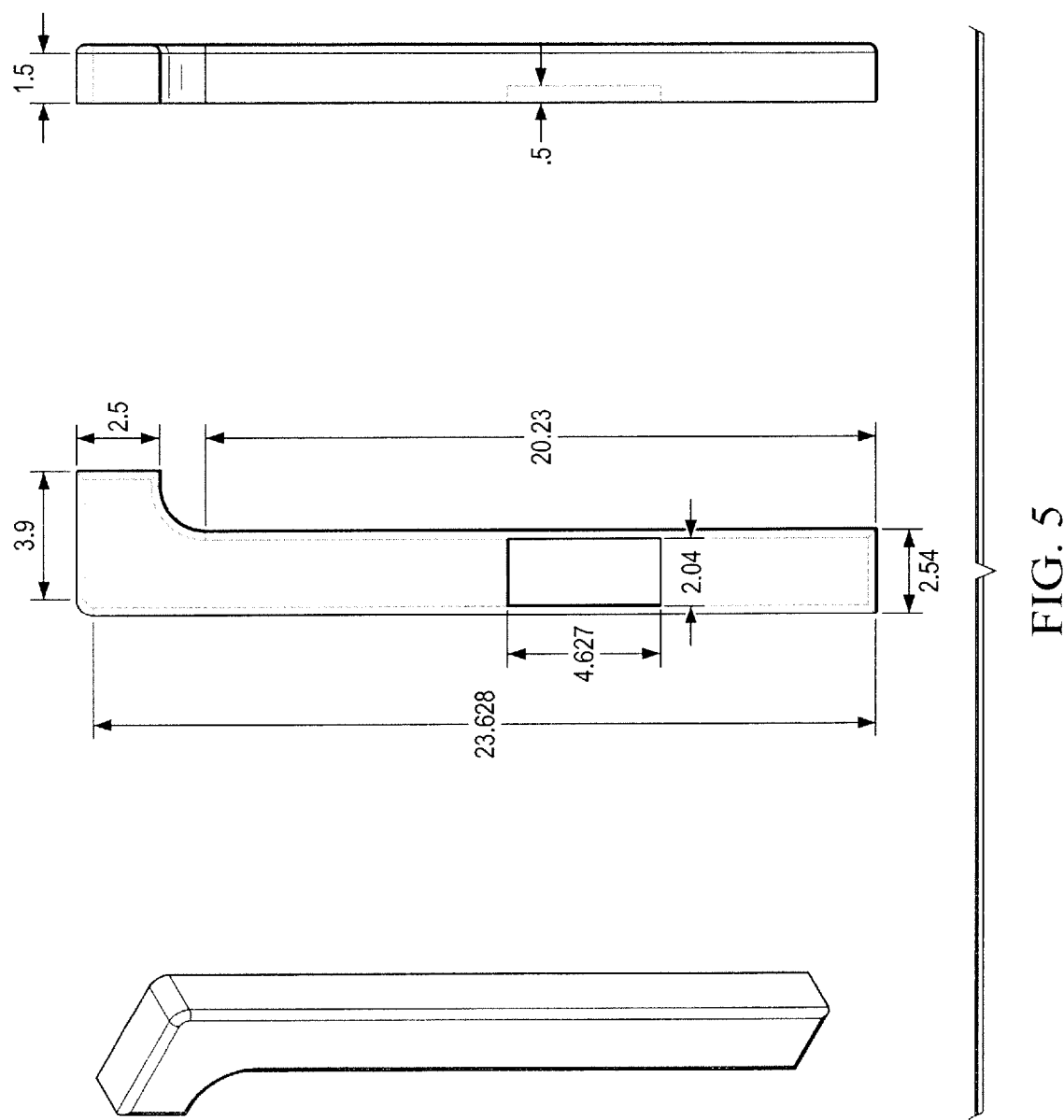
FIG. 5 shows dimensional data for energy absorbing material for a rear section of a door of a tactical vehicle in accordance with an embodiment of the present invention.
Figure 6:
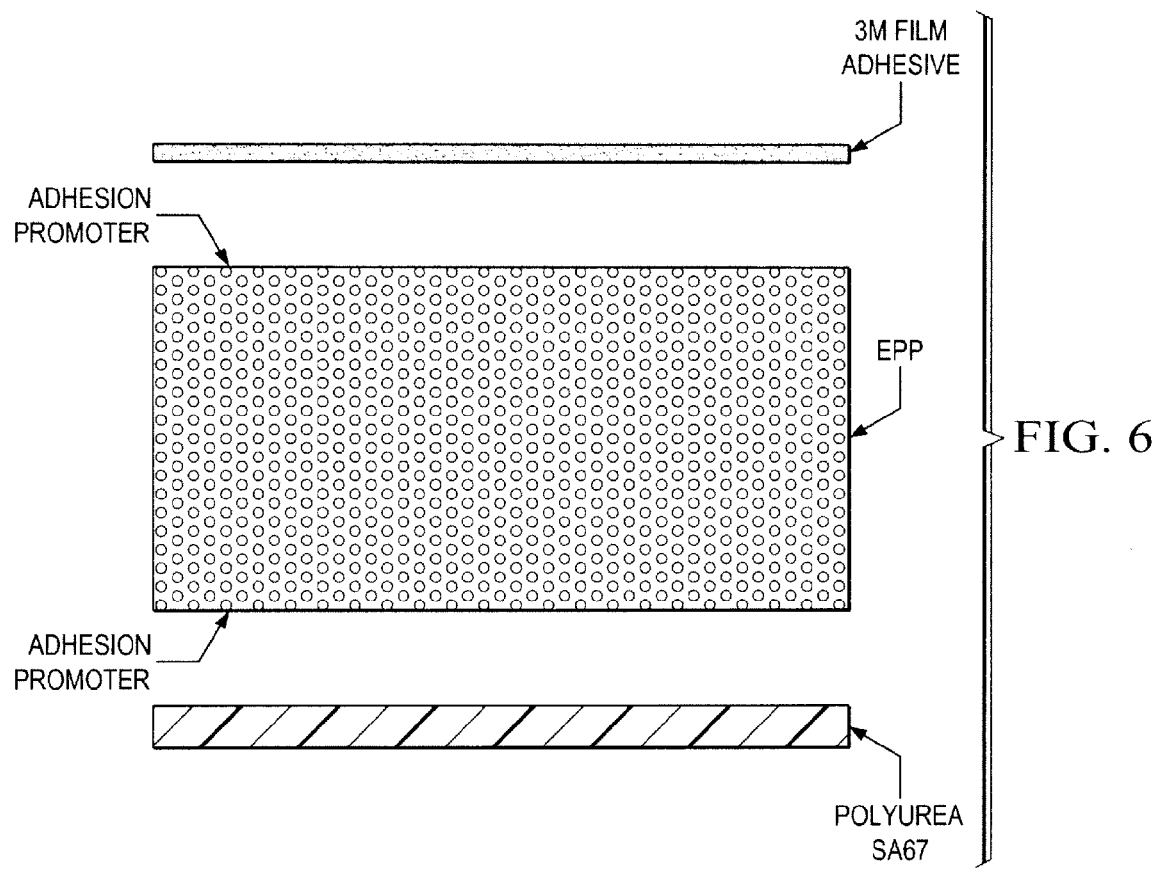
FIG. 6 shows an exploded view of five layers of an energy absorbing material in accordance with an embodiment of the present invention.
Figure 7:
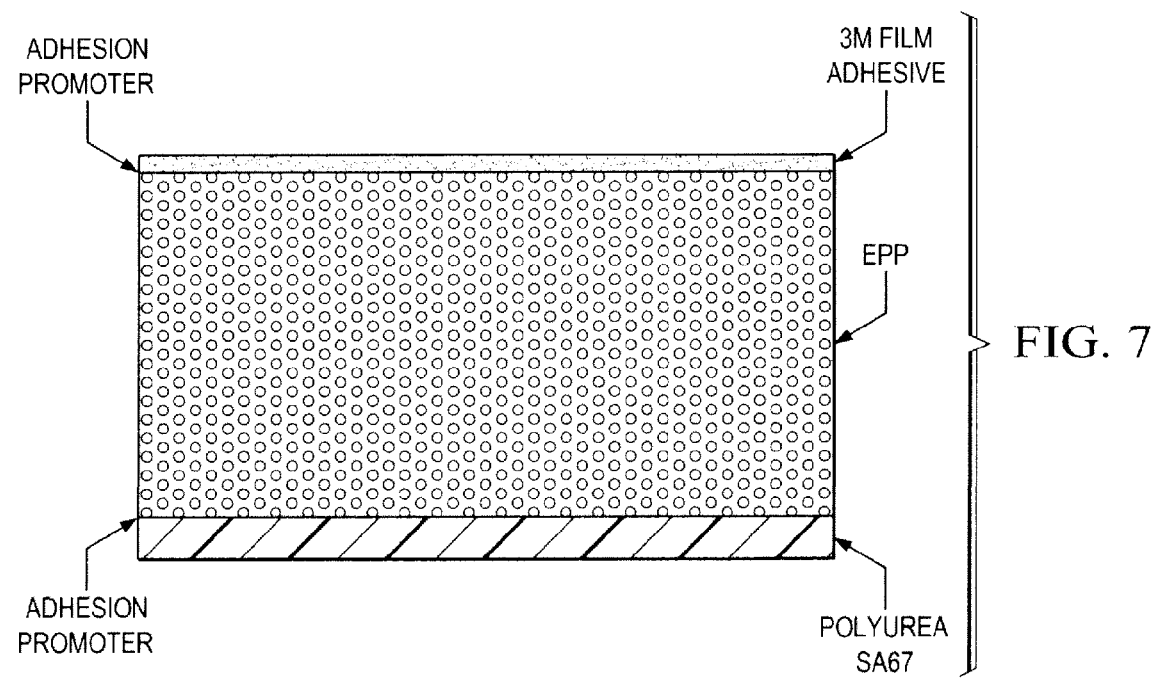
FIG. 7 shows five combined layers of an energy absorbing material in accordance with an embodiment of the present invention.

The present invention relates to an energy absorbing material, which may be used in tactical or other vehicles. In an embodiment of the invention, the energy absorbing material may comprise a core material with an elastomeric top coating material.

In one embodiment, the invention comprises an energy absorbing material including a core material, preferably an aluminum honeycomb, polurethane foam or expanded polypropylene foam. In this embodiment, the core material provides the main energy absorbing function for the energy absorbing material. The energy absorbing composite may further comprise a protective material, which is applied to the core material to enhance durability of the energy absorbing material. The protective material may be applied to the core material using any viable technique, including spraying or painting, and may comprise external polyurethane, polyurea, or other durable suitable skin forming materials. In one embodiment of the invention, the protective material may be a polyurea compound formed from a first mixture, the first mixture comprising Jeffamine D-2000 (polyoxypropylene diamine at a concentration of 60% to 100%), DETDA (diethyltoluenediamine), and Unilink 4200 (N,N'-dialkylamino-diphenylmethane). and a second mixture, the second mixture comprising: Mondur ML (diphenylmethane diisocyanate), PTMEG 2000, and propylene carbonate. In one embodiment of the invention, the protective material may be a polyurea compound formed from a first mixture, the first mixture comprising approximately 65 wt % to 85 wt % Jeffamine D-2000 (polyoxypropylene diamine at a concentration of 60% to 100%), approximately 13 wt % to 23 wt % DETDA (diethyltoluenediamine), and approximately 7 wt % to 17 wt % Unilink 4200 (N,N'-dialkylamino-diphenylmethane), and a second mixture, the second mixture comprising: approximately 45.5 wt % to 55.5 wt % Mondur ML (diphenylmethane diisocyanate), 41.5 wt % to 51.5 wt % PTMEG 2000, and <1 wt % to 8 wt % propylene carbonate. In one embodiment of the invention, the protective material may be a polyurea compound formed from a first mixture, the first mixture comprising approximately 70.01 wt % Jeffamine D-2000 (polyoxypropylene diamine at a concentration of 60% to 100%), 17.99 wt % DETDA (diethyltoluenediamine), and 12 wt. % Unilink 4200 (N,N'-dialkylamino-diphenylmethane), and a second mixture, the second mixture comprising: 50.5 wt % Mondur ML (diphenylmethane diisocyanate). 46.5 wt % PTMEG 2000 (poly(tetramethylene ether)glycol), and 3.00 wt % propylene carbonate.

In some embodiments, the energy absorbing material may be incorporated into a spall liner capable of eliminating or reducing ballistic spall, fragments, shards or splinters from passing thought the vehicle outer skin and provide impact protection to the occupants of the vehicle do to a collision, explosion, or heavy artillery fire. The composite energy absorber may be covered in material such as a fabric material, a nylon material, a polyethylene fiber, a para-aramid fiber, a polyurea of a polyurethane, or a military grade canvas.

In another embodiment, the energy absorbing material may comprise a core material coated with an adhesion promoter. The adhesion promoter may be any compound capable of causing the core material to adhere to another substance or improving the ability of the core material to adhere to another substance. The energy absorbing material may further comprise a protective material, preferably a polyurea. The energy absorbing material may further comprise an adhesive, preferably a film adhesive. In a preferred embodiment, the adhesion promoter improves the ability of the core material to adhere to the protective material and the adhesive. The film adhesive may aid in affixing the energy absorbing material to a surface, such as the interior surface of the tactical vehicle. In one embodiment, the adhesion promoter may be a liquid coating bonding compound.

In another embodiment, the energy absorbing material may be produced by sizing a core material to the desired dimensions. The core material may be aluminum honeycomb or expanded polypropylene. A protective material may then be applied to the core material. The protective material may be polyurethane or polyurea.

The protective material may be applied using any appropriate application technique; preferably the protective material is sprayed or painted on to the core material.

Energy absorbing material according to the present invention can be used to provide occupant protection in vehicles, preferably as interior appliqué in tactical vehicles. The energy absorbing material may be used in tactical vehicle blast resistant seats. The energy absorbing material may also be used in marine vessels, aircraft, private vehicles, or carried on the body of a person. The energy absorbing material may provide protection from high-energy blast events, deceleration impacts, crashes and vehicle rollovers.

Energy absorbing material according to the present invention is flexible, which enables the energy absorbing material to conform to the interior surfaces of a vehicle and to absorb energy. In preferred embodiments, the energy absorbing material may be used on the dashboard, gun turret, inner roof, doors, A and B pillars or any interior surface of a vehicle.

The term head injury criterion (HIC) score, as used herein, refers to a quantitative measurement of the likelihood of life threatening brain injury.

The term HIC (d) score, as used herein, refers to an adjusted to HIC score from free motion headform (FMH) simulation test data which reflects the behavior of a human head compared to a the test dummy headform.

EXAMPLE 1

Expanded polypropylene (EPP) core energy absorbing material with a density of 1.3 to 2.2 pounds per cubic foot (pcf) black grade was obtained (JSP International, Madison Heights, Mich.). The EPP core energy was obtained in plank form and cut to specified shape and thickness, or cast to the specified shape.

4298 adhesion promoter (3M™) purchased from BondPro Corporation was applied to the EPP panel top surface. The adhesion promoter may be brushed or sprayed. Adhesion promoter was allowed to dry at least one hour.

A polyurea elastomeric coating was applied to an EPP panel top surface at a thickness of 0.030 to 0.250 inches with a spray proportioning unit such as a Gusmer HV-20/25 or equivalent. Excess polyurea was trimmed. 4298 adhesion promoter (3M™) was applied to the EPP panel back surface, and allowed to dry for 1 hour.

5356 film adhesive (3M™) was applied to the back of the EPP panel.

EXAMPLE 2

A panel of 12 to 15 psi aluminum honeycomb approximately 1 inch thick was sized to fit surface of a B pillar of a military tactical vehicle. A layer of screen or scrim cloth is placed over the surface of the aluminum honeycomb, and then sprayed with polyurea to achieve a total panel thickness of approximately 1.1 inches. The polyurea is allowed to cure, and the composite aluminum honeycomb panel is mounted inside the vehicle.

EXAMPLE 3

A panel of expanded polypropylene approximately 1.9 inches thick is sized to fit in pillar A of a military tactical vehicle. The top surface is sprayed with an adhesion promoter, and then sprayed with polyurea to achieve a total panel thickness of approximately 2.0 inches. The polyurea is allowed to cure, and the composite expanded polypropylene panel is mounted in the vehicle.

EXAMPLE 4

Impact protection studies were conducted in compliance with FMVSS 201 laboratory testing procedures. FMVSS 201 procedures are described in U.S. DEPARTMENT OF TRANSPORTATION, NATIONAL HIGHWAY TRAFFIC SAFETY ADMINISTRATION LABORATORY TEST PROCEDURE FOR FMVSS 201: Occupant Protection in Interior Impact, which is incorporated herein by reference, in its entirety.

Impact protection studies were carried out using a standard dummy Free Motion Headform (FMH) impactor with and with out advanced combat helmet (ACH). Accelerometers were used as sensors, and two accelerometers were placed inside the dummy free motion headform front face in the uniaxial direction. Force vs. displacement data was derived using the procedure as outlined in FMVSS 201.

Figure 33:
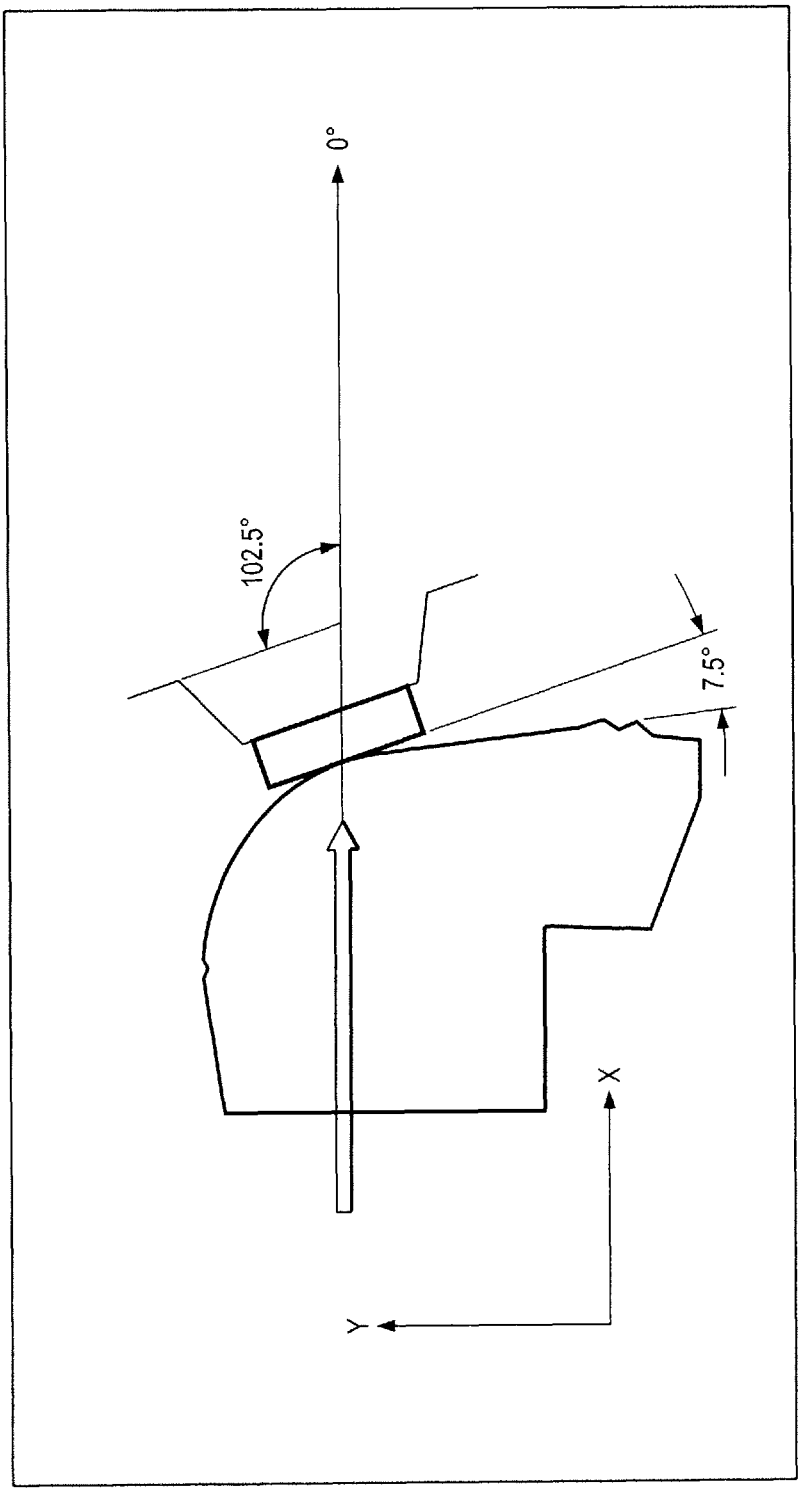
FIG. 33 shows approximate Free Motion Headform Impact orientation for FMVSS 201 tests. The headform is allowed to rotate freely as it hits the impacting surface.

For testing, energy absorbing material in an embodiment of the present invention was vertically secured to a work surface. An impactor connected to a Free-Motion HeadForm (FMH) (per FMVSS 201U) wearing an Advanced Combat Helmet (ACH) was positioned at a downward angle of 17.5° from horizontal such that the FMHF would make first contact upon the forehead region. The total moving mass of the Impactor Propulsion System, FMHF, ACH and all connecting devices was 7.1123 kg. Approximate illustration shown in FIG. 33.

The FMH test system was pre set to impact the target at a velocity of 24 kph (per FMVSS 201U).

EXAMPLE 5

Tables 1a and 1b show impact protection testing results for several samples. Tests 1-3 were conducted with energy absorbing materials in an embodiment of the present invention, while Tests 4 and 5 were conducted without any sample (i.e. the FMH impacted bare steel) with and without Advanced Combat Helmet ACH.

TABLE 1a

Test results of energy absorbing material in embodiments of the present invention, and control tests.

| Test No | MGA Test No. | Description Sample | ACH | Impact Velocity (kPh) | HIC | HIC (d) | Post-Test Comments |
|---|---|---|---|---|---|---|---|
| 1 | FH9354 | EPP 1.3 PCF | Gentex SA67 | 23.9 | 615.2 | 630.5 | No visual damage |
| 2 | FH9355 | EPP 1.8 PCF | Gentex SA67 | 23.9 | 735.4 | 721.3 | No visual damage |
| 3 | FH9356 | EPP 1.8 PCF | Gentex SA67 | 22.7 | 724.2 | 712.8 | No visual damage |
| 4 | FH9357 | None | Gentex SA67 | 23.2 | 2394.0 | 1972.5 | No visual damage |
| 5 | FH9358 | None | None | 25.2 | 3712.8 | 2967.6 | No visual damage |

Note:
Test Numbers FH9357-FH19358 were conducted without any sample (i.e. The FMH impacted bare steel). To be used as a baseline for comparing the EA material (per customer request).

TABLE 1b

Test results of energy absorbing material in embodiments of the present invention, and control tests.

| Test number | Material Description | Thickness (inches) | Velocity (kph) | HIC (d) |
|---|---|---|---|---|
| FHTRIEA1 | TRI EA 15 psi honeycomb with polyurea top coating | 1.5 | 24.18 | 775 |

EXAMPLE 6

Test FH9354 was conducted with EPP at a density of 1.3 PCF with SA67 polyurea top coating. The SA67 polyurea top coating was formed from a first mixture, the first mixture comprising approximately 70.01 wt % Jeffamine D-2000 (polyoxypropylene diamine at a concentration of 60% to 100%), 17.99 wt % DETDA (diethyltoluenediamine), and 12 wt. % Unilink 4200 (N,N'-dialkylamino-diphenylmethane), and a second mixture, the second mixture comprising: 50.5 wt % Mondur ML (diphenylmethane diisocyanate). 46.5 wt % PTMEG 2000 (poly(tetramethylene ether)glycol). and 3.00 wt % propylene carbonate.

Figure 8A:
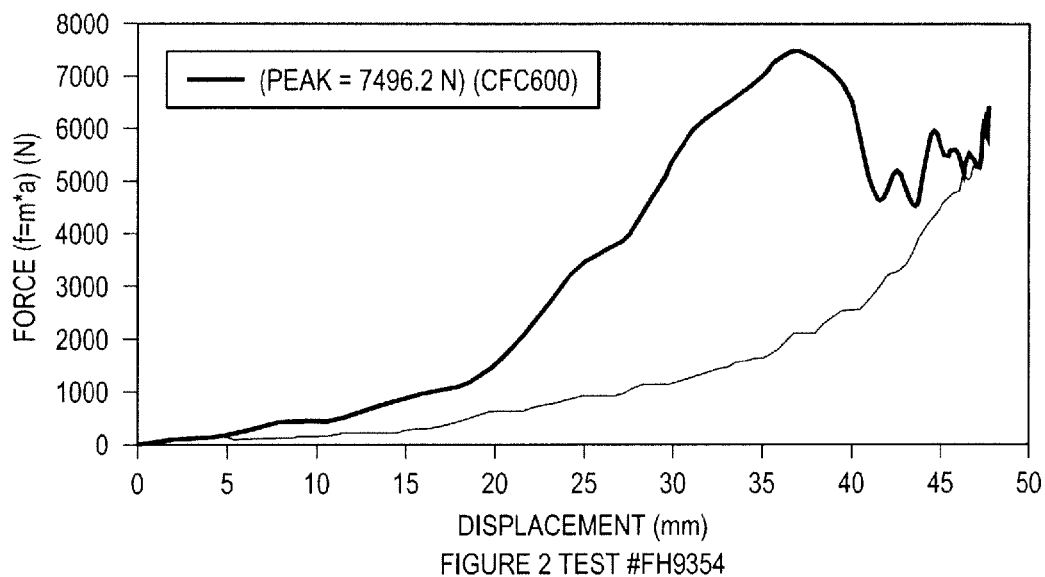
FIG. 8 shows force plotted against displacement and force plotted against time for Test FH9354, in an embodiment of the present invention.
Figure 8B:
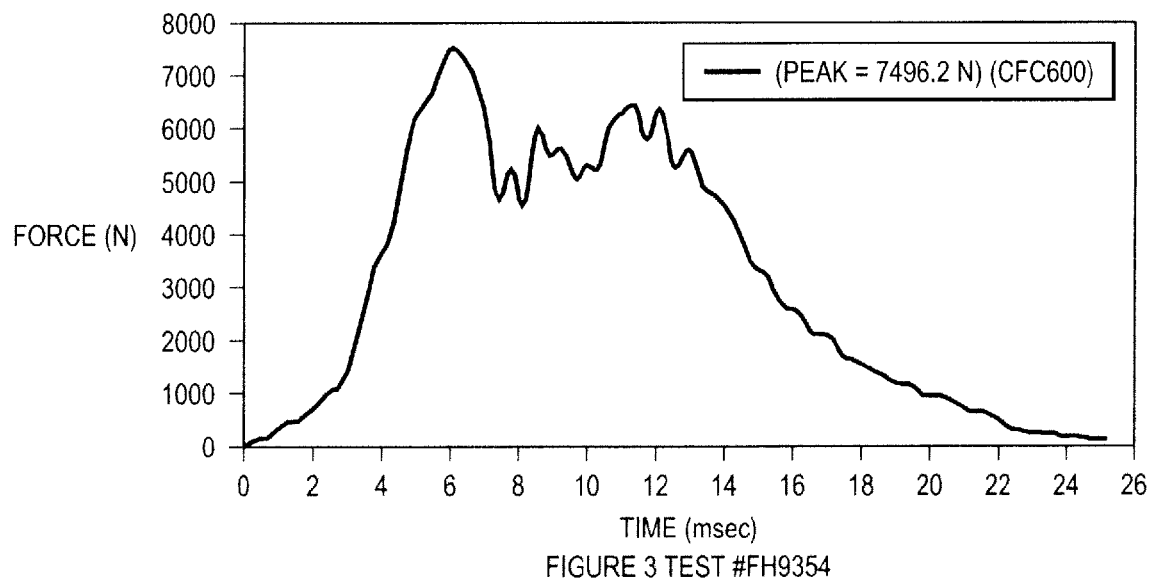

FIG. 8a shows force plotted against displacement for Test FH9354, with a peak force of 7496.2 N. FIG. 8b shows force plotted against time for Test FH9354, with a peak force of 7496.2 N.

Figure 9A:
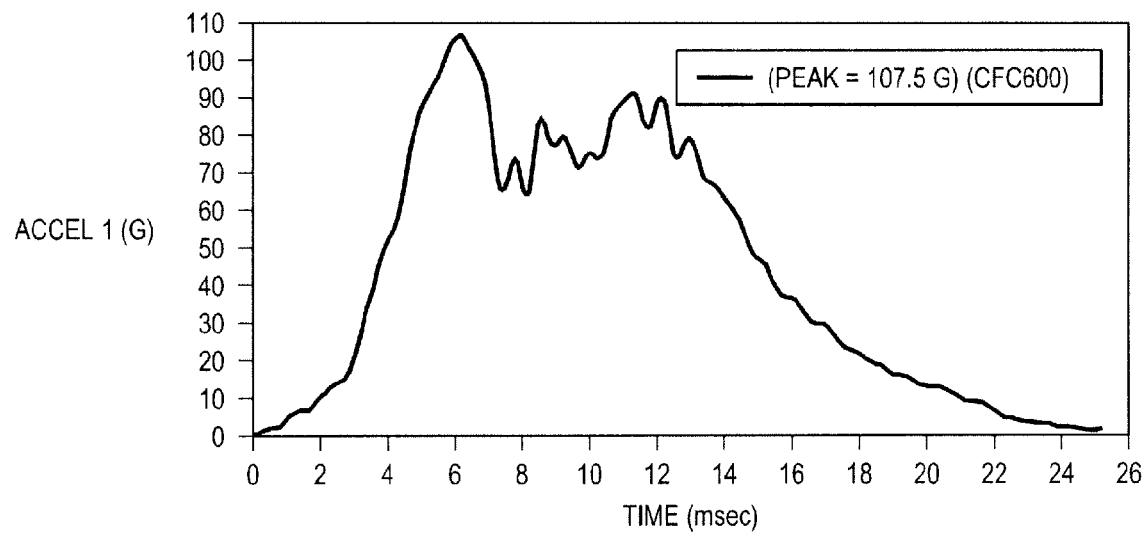
FIG. 9 shows acceleration plotted against time for Test FH9354, in an embodiment of the present invention.
Figure 9B:
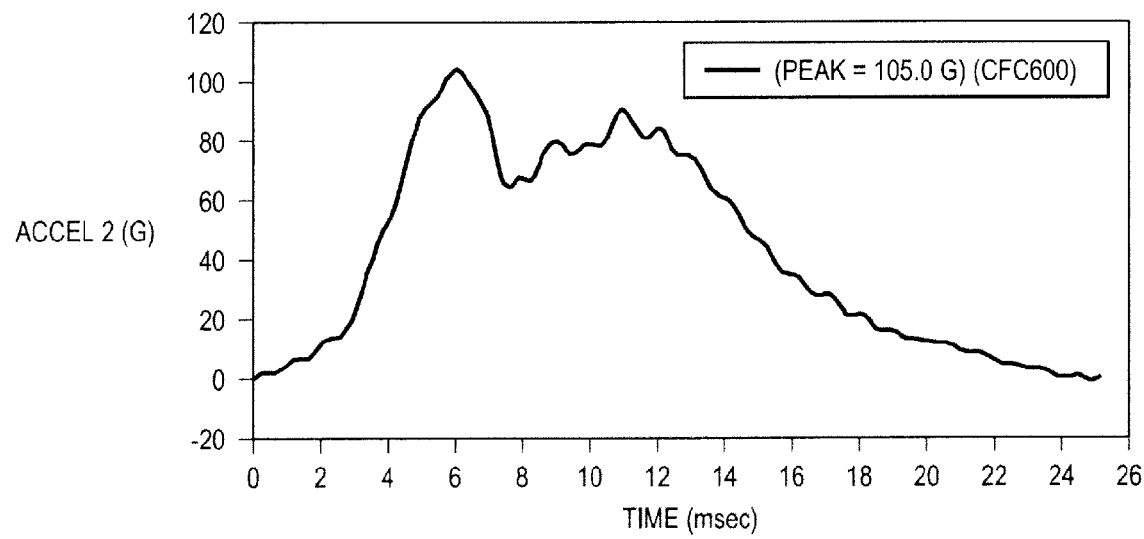

FIGS. 9a and 9b show acceleration plotted against time for Test FH9354. Accelerometer 1 (FIG. 9a) experienced a peak acceleration of 107.5 G, while Accelerometer 2 (FIG. 9b) experienced a peak acceleration of 105.0 G.

Figure 10A:
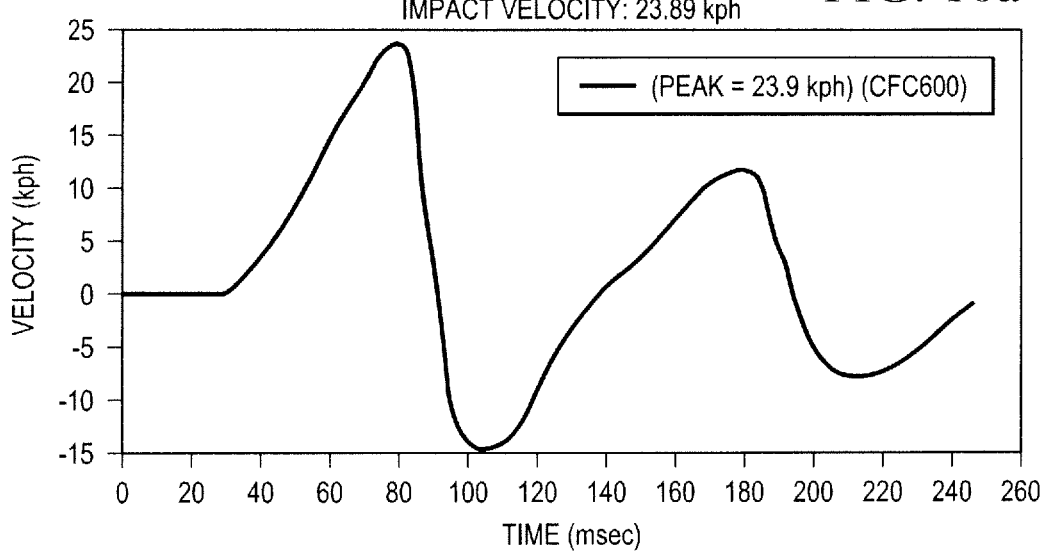
FIG. 10 shows velocity plotted against time and displacement plotted against time for Test FH9354, at a peak velocity of 23.9 kph, in an embodiment of the present invention.
Figure 10B:
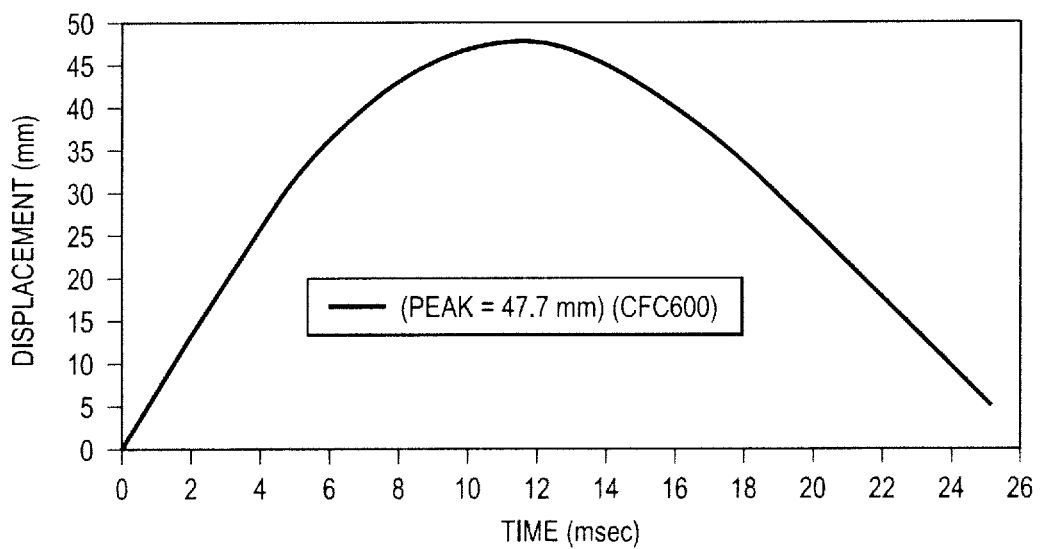

FIG. 10a shows velocity plotted against time for Test FH9354 peak velocity of 23.9 kph. FIG. 10b shows displacement plotted against time for Test FH9354, with a peak displacement of 47.7 mm.

FIG. 11 shows energy plotted against displacement for Test FH9354, with peak energy of 153 J.

Tables 1a and 1b show that in the test of FH9354 (Test No. 1), a peak velocity of 23.9 kph was reached. A HIC score of 615.2 was calculated, and a HIC (d) score of 630.5 was calculated.

EXAMPLE 7

Test FH9355 was conducted with EPP at a density of 1.8 PCF with SA67 polyurea top coating. The SA67 polyurea top coating was formed from a first mixture, the first mixture comprising approximately 70.01 wt % Jeffamine D-2000 (polyoxypropylene diamine at a concentration of 60% to 100%). 17.99 wt % DETDA (diethyltoluenediamine), and 12 wt. % Unilink 4200 (N,N'-dialkylamino-diphenylmethane), and a second mixture, the second mixture comprising: 50.5 wt % Mondur ML (diphenylmethane diisocyanate). 46.5 wt % PTMEG 2000 (poly(tetramethylene ether)glycol), and 3.00 wt % propylene carbonate.

Figure 12A:
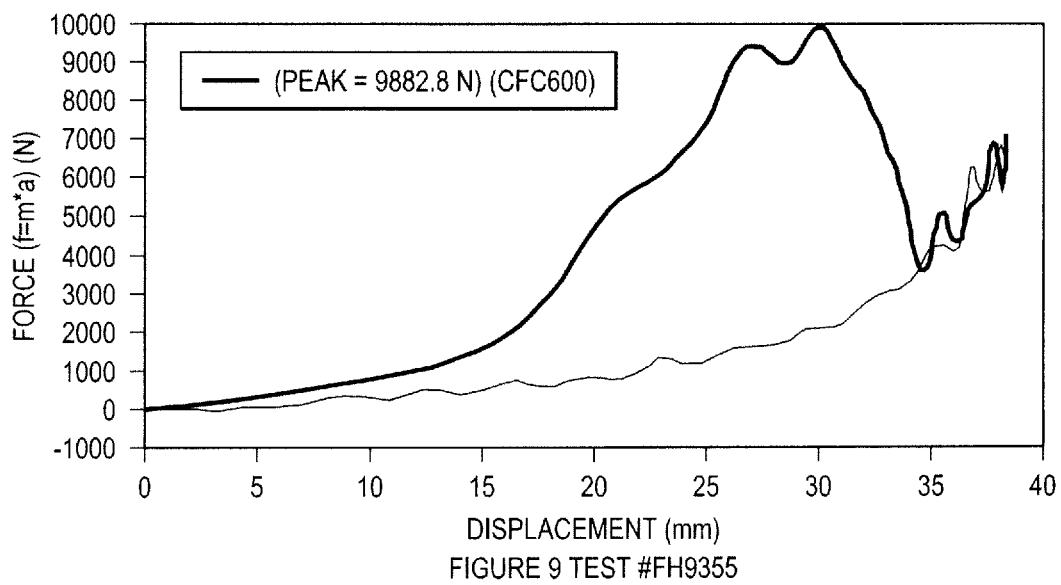
FIG. 12 shows force plotted against displacement and force plotted against time for Test FH9355, in an embodiment of the present invention.
Figure 12B:
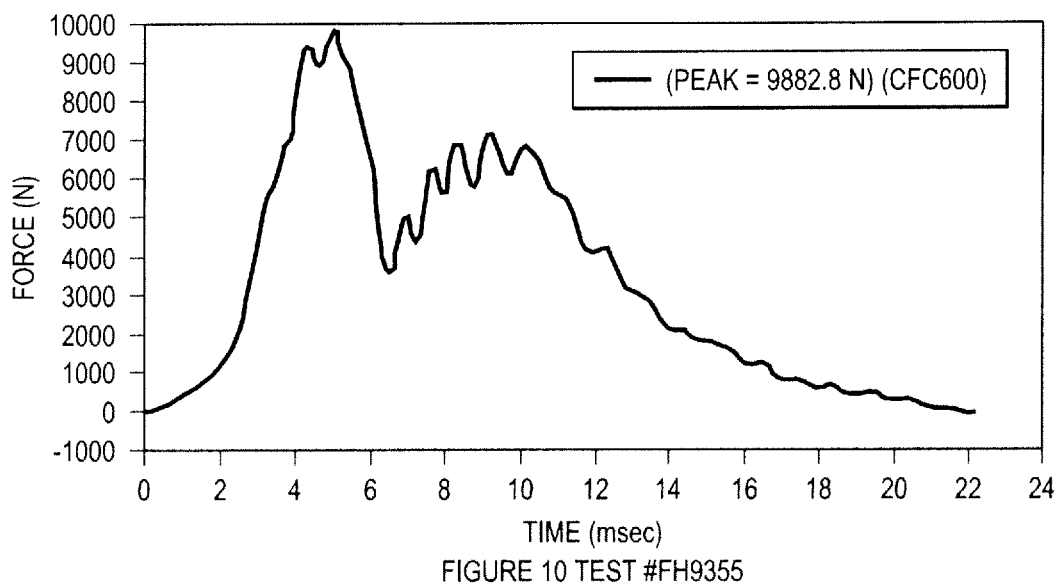

FIG. 12a shows force plotted against displacement for Test FH9355, with a peak force of 9882.8 N. FIG. 12b shows force plotted against time for Test FH9355, with a peak force of 9882.8 N.

Figure 13A:
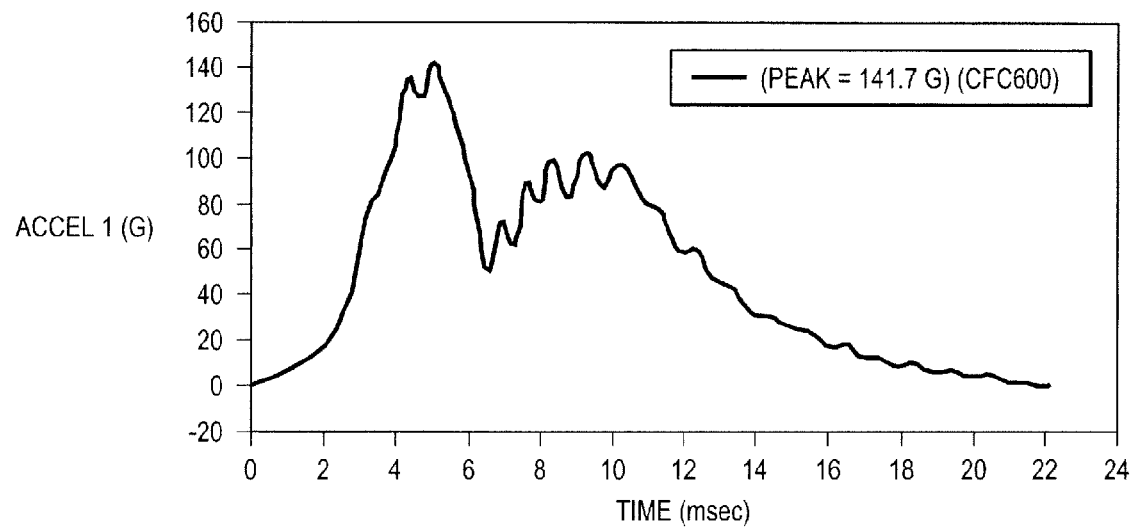
FIG. 13 shows acceleration plotted against time for Test FH9355, in an embodiment of the present invention.
Figure 13B:
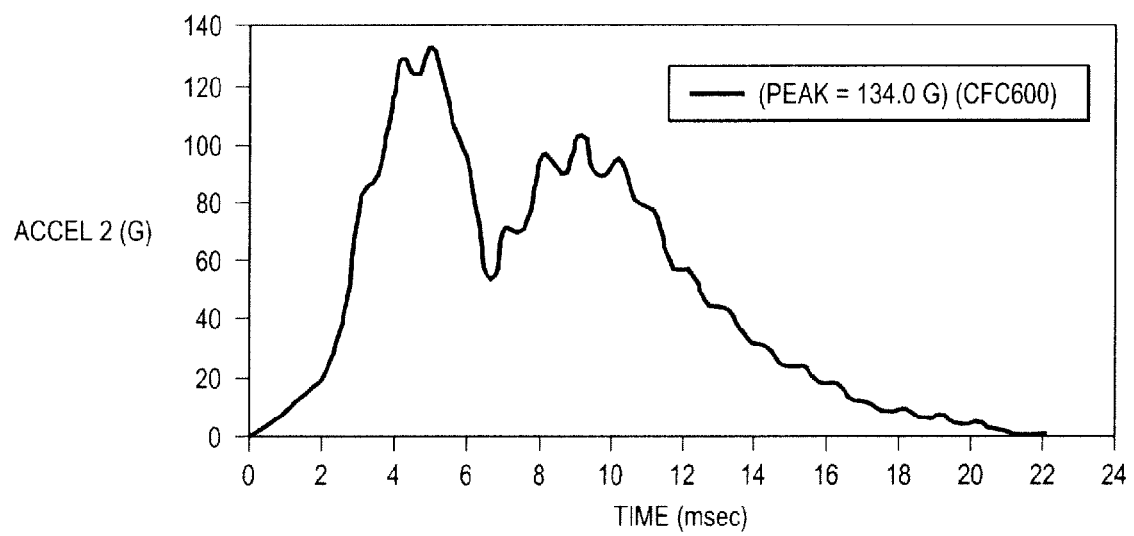

FIGS. 13a and 13b show acceleration plotted against time for Test FH9355. Accelerometer 1 (FIG. 13a) experienced a peak acceleration of 141.7 G, while Accelerometer 2 (FIG. 13b) experienced a peak acceleration of 134.0 G.

Figure 14A:
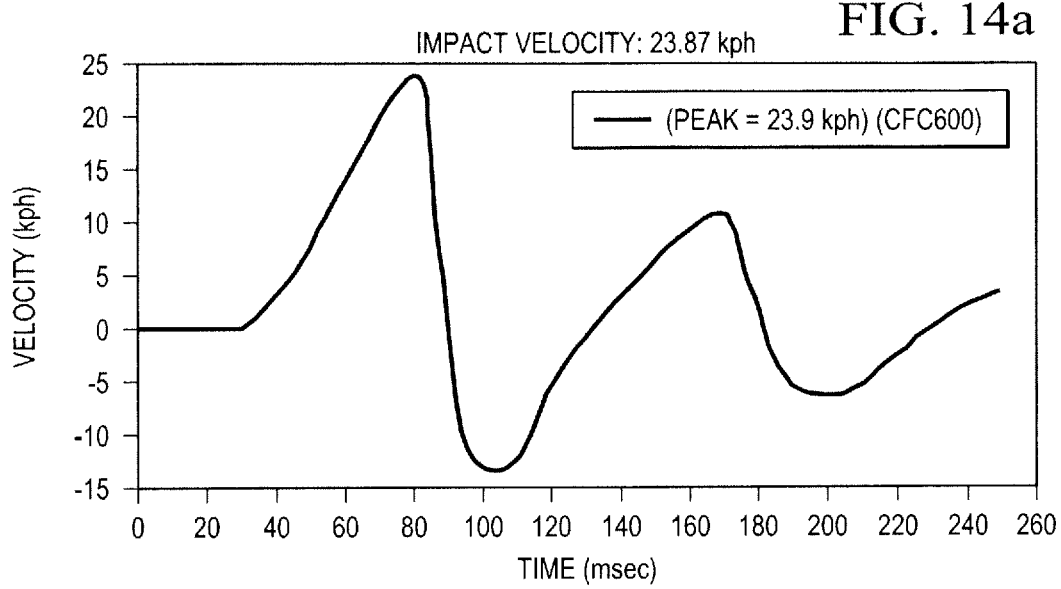
FIG. 14 shows velocity plotted against time and displacement plotted against time for Test FH9355, in an embodiment of the present invention.
Figure 14B:
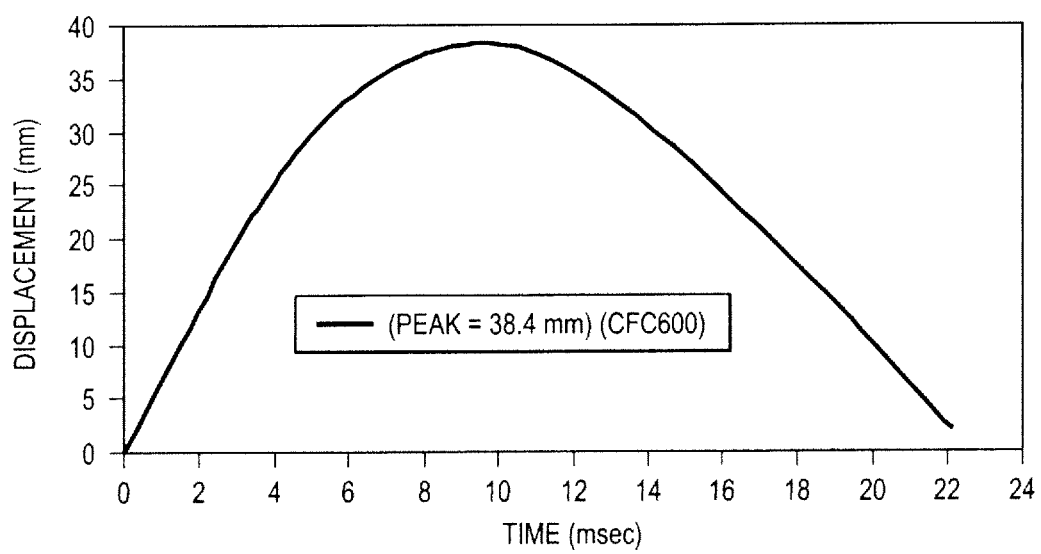

FIG. 14a shows velocity plotted against time for Test FH9355, with a peak velocity of 23.9 kph. FIG. 14b shows displacement plotted against time for Test FH9355, with a peak displacement of 38.4 mm.

Figure 15:
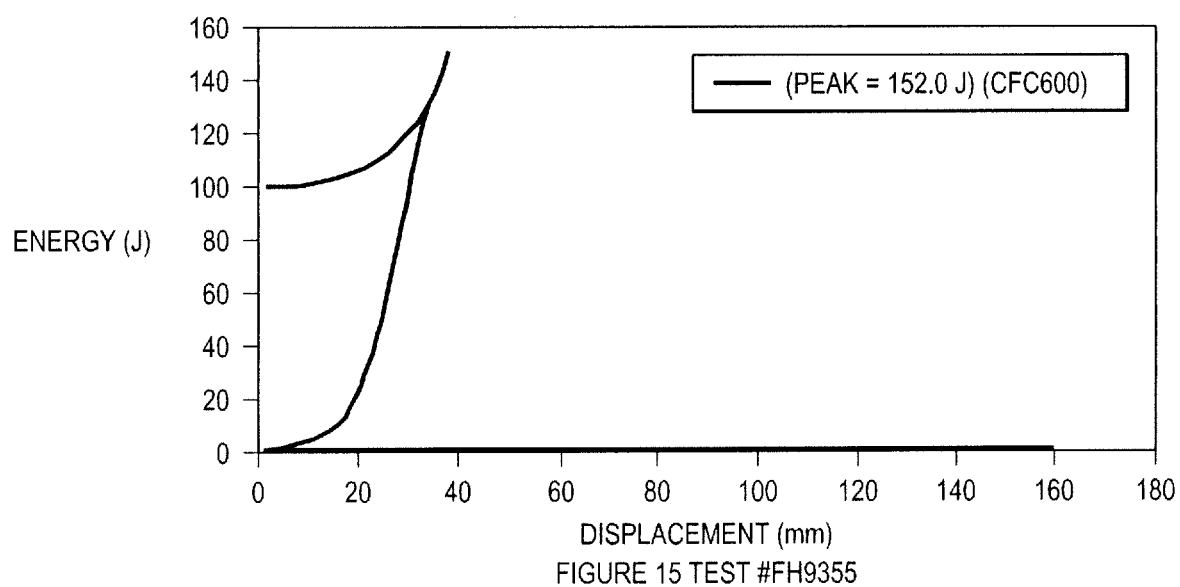
FIG. 15 shows energy plotted against displacement for Test FH9355, in an embodiment of the present invention.

FIG. 15 shows energy plotted against displacement for Test FH9355, with peak energy of 152.0 J.

Tables 1a and 1b show that in the test of FH9355 (Test No. 2), a peak velocity of 23.9 kph was reached. A HIC score of 735.4 was calculated, and a HIC (d) score of 721.3 was calculated.

EXAMPLE 8

Test FH9356 was conducted with already impacted sample FH9355 described in Example 7 which used EPP at a density of 1.8 PCF with SA67 polyurea top coating. The SA67 polyurea top coating was formed from a first mixture, the first mixture comprising approximately 70.01 wt % Jeffamine D-2000 (polyoxypropylene diamine at a concentration of 60% to 100%), 17.99 wt % DETDA (diethyltoluenediamine), and 12 wt. % Unilink 4200 (N,N'-dialkylamino-diphenylmethane), and a second mixture, the second mixture comprising: 50.5 wt % Mondur ML (diphenylmethane diisocyanate), 46.5 wt % PTMEG 2000 (poly(tetramethylene ether)glycol), and 3.00 wt % propylene carbonate. Test FH9356 was conducted to demonstrate that the energy absorbing system of the present invention is capable of providing occupant protection in multiple impacts events.

Figure 16A:
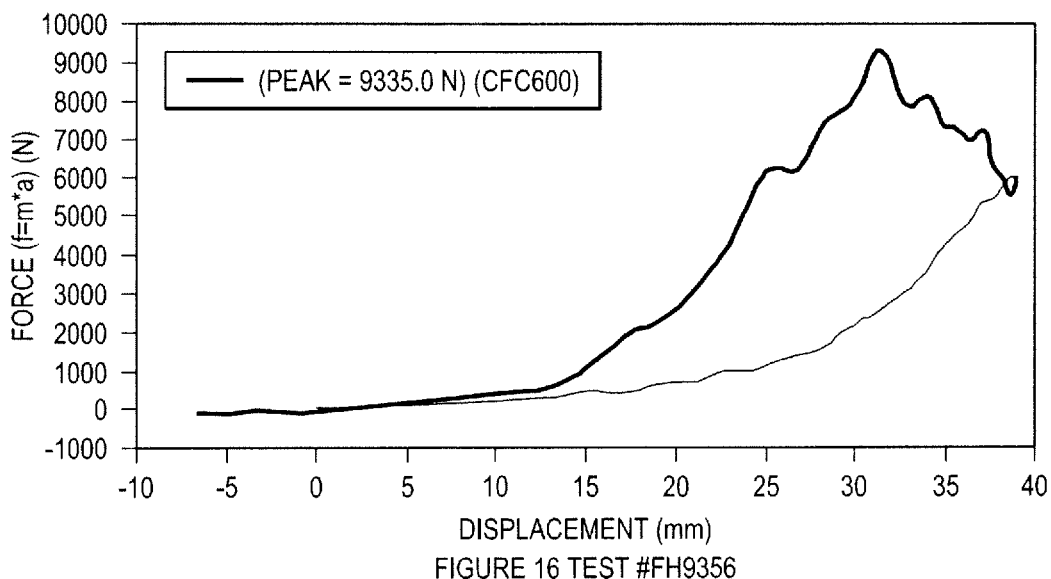
FIG. 16 shows force plotted against displacement and force plotted against time for Test FH9356, in an embodiment of the present invention.
Figure 16B:
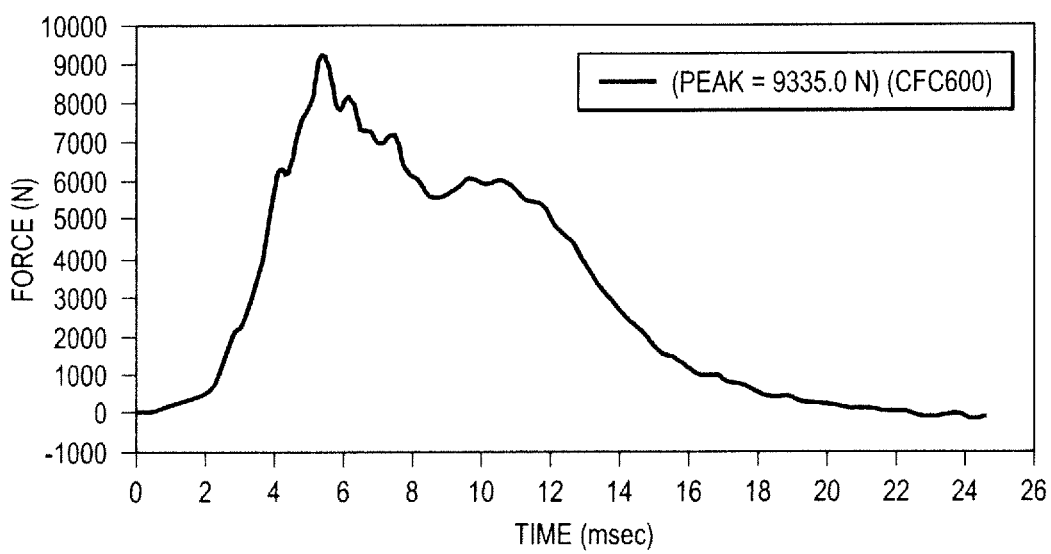

FIG. 16a shows force plotted against displacement for Test FH9356, with a peak force of 9335.0 N. FIG. 16b shows force plotted against time for Test FH9356, with a peak force of 9335.0 N.

Figure 17A:
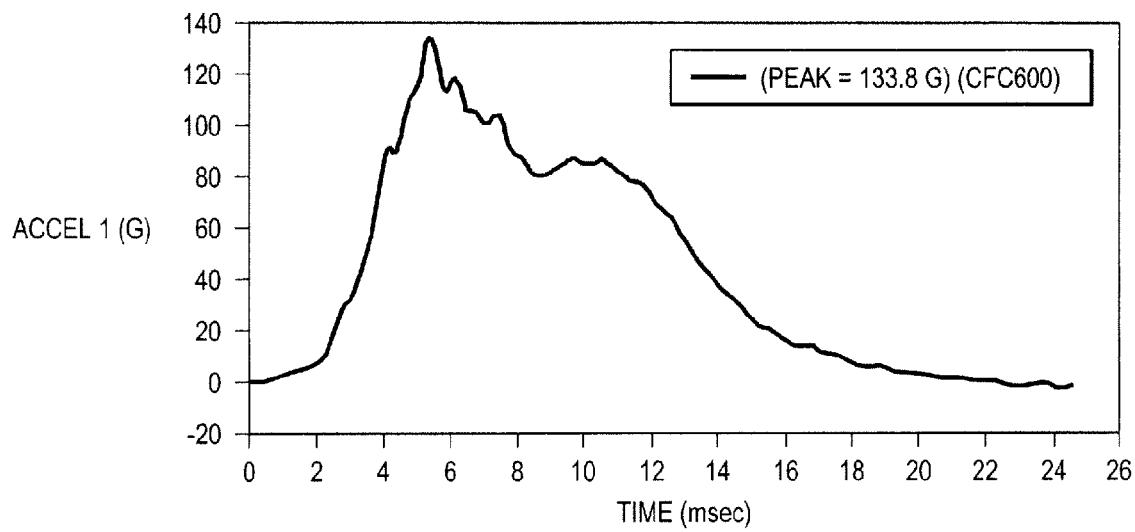
FIG. 17 shows acceleration plotted against time for Test FH9356, in an embodiment of the present invention.
Figure 17B:
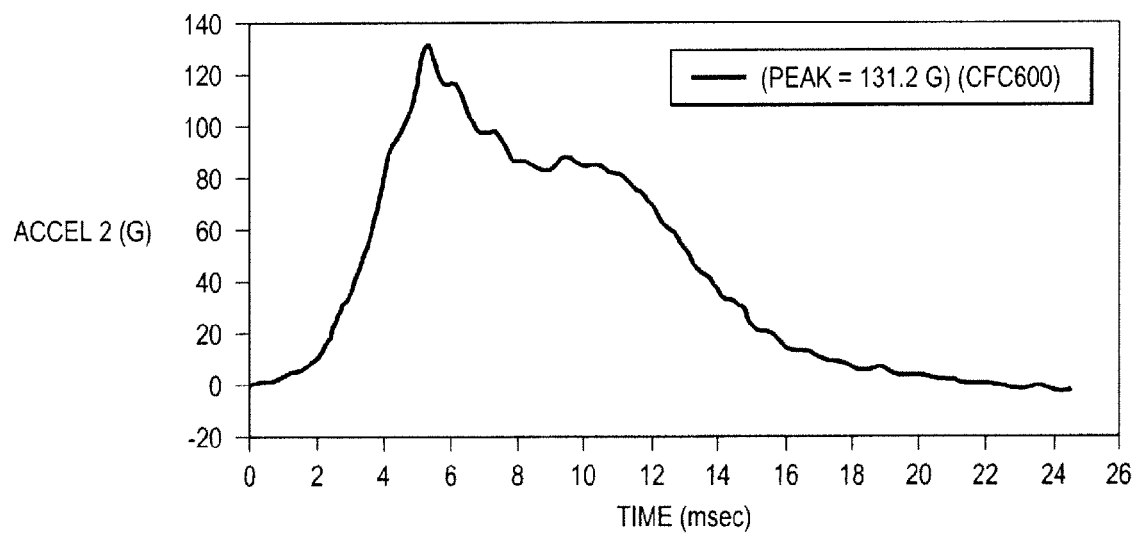

FIGS. 17a and 17b show acceleration plotted against time for Test FH9356. Accelerometer 1 (FIG. 17a) experienced a peak acceleration of 133.8 G, while Accelerometer 2 (FIG. 17b) experienced a peak acceleration of 131.2 G.

Figure 18A:
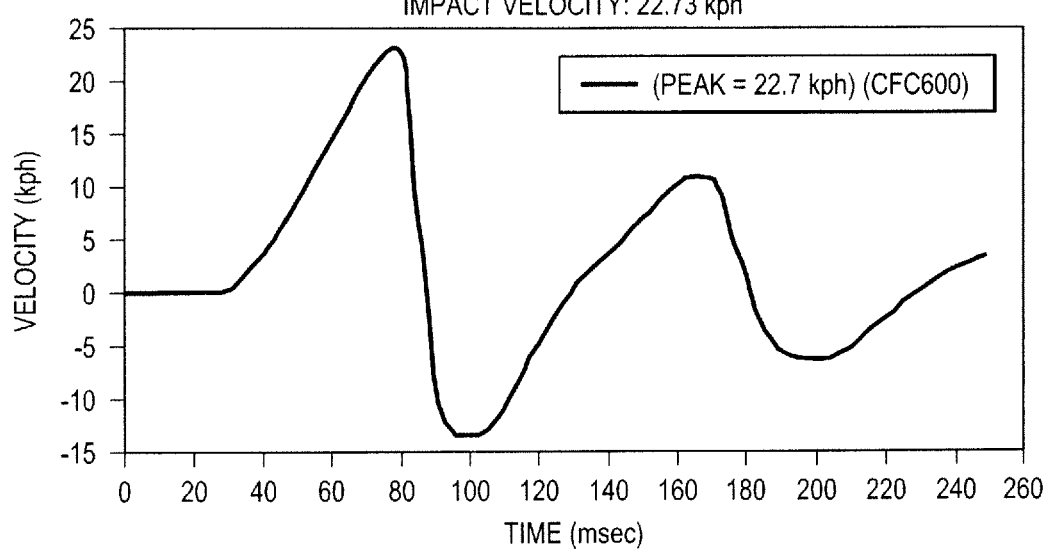
FIG. 18 shows velocity plotted against time and displacement plotted against time for Test FH9356, in an embodiment of the present invention.
Figure 18B:
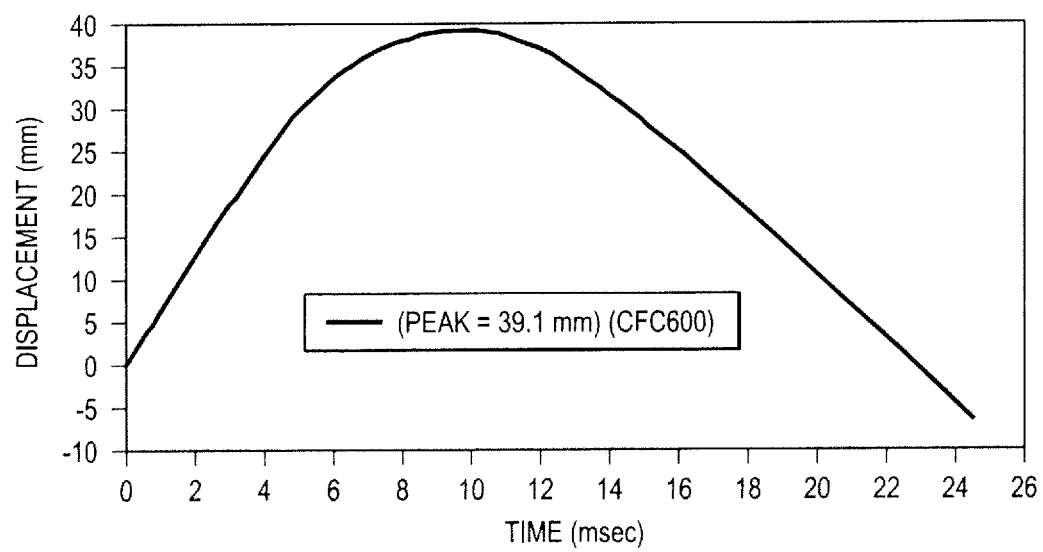

FIG. 18a shows velocity plotted against time for Test FH9356, with a peak velocity of 22.7 kph. FIG. 18b shows displacement plotted against time for Test FH9356, with a peak displacement of 39.1 mm.

FIG. 19 shows energy plotted against displacement for Test FH9356, with a peak energy of 137.8 J.

Tables 1a and 1b show that in the test of FH9356 (Test No. 3), a peak velocity of 22.7 kph was reached. A HIC score of 724.2 was calculated, and a HIC (d) score of 712.8 was calculated. These HIC and HIC (d) scores compare favorably to the HIC and HIC(d) scores obtained from the first impact of this sample described in Example 7.

EXAMPLE 9

Tests FH9357 and FH9358 were conducted without any energy absorbing material target such that FMH with and without advanced combat helmet impacted a bare steel surface. These tests provide a baseline for comparing the samples tested in tests FH9354, FH9355, and FH9356.

Figure 20A:
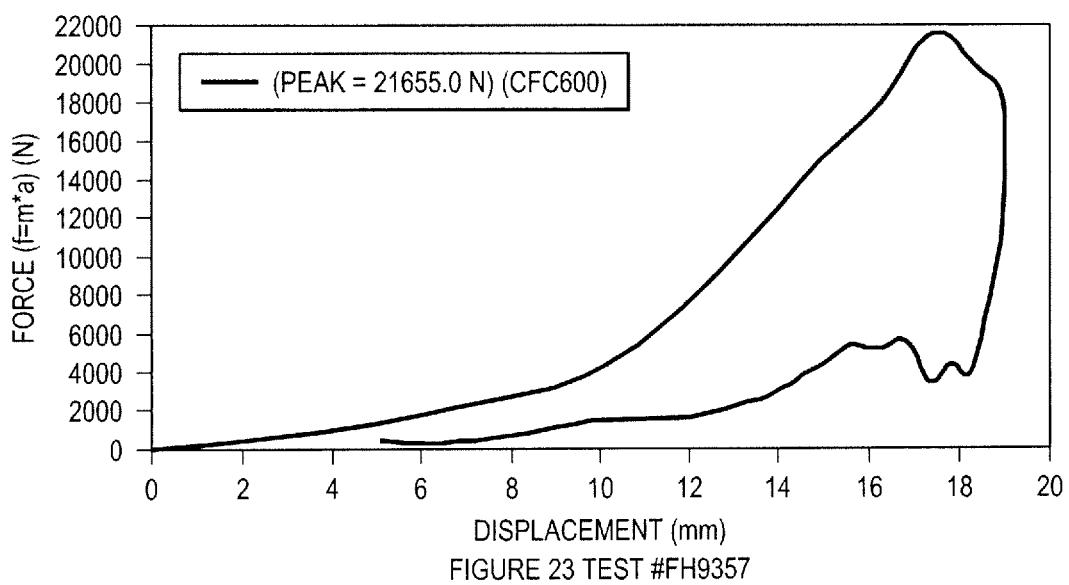
FIG. 20 shows force plotted against displacement and force plotted against time for Test FH9357, in an embodiment of the present invention.
Figure 20B:
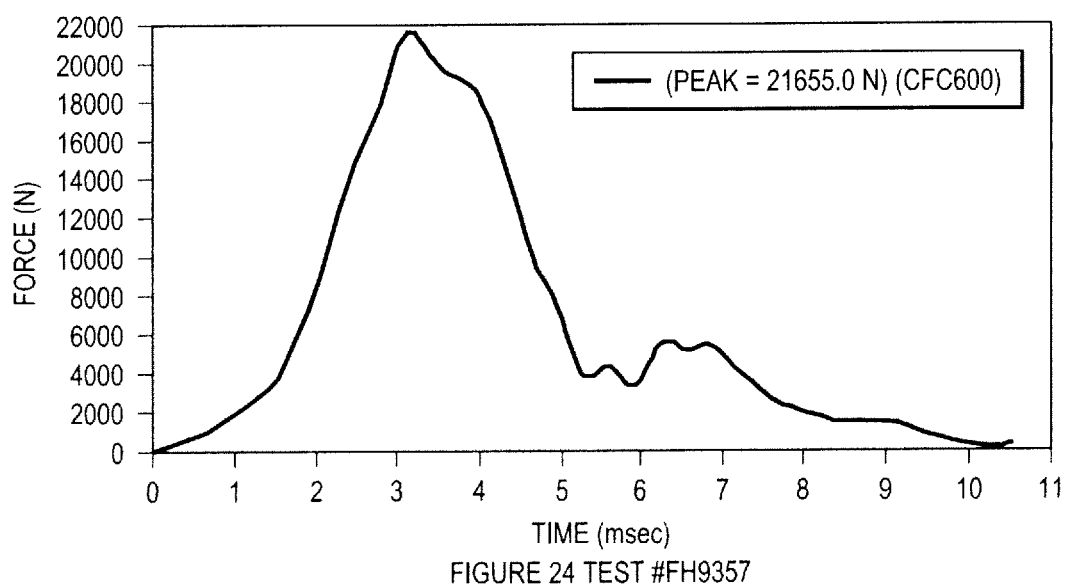

FIG. 20a shows force plotted against displacement for Test FH9357, with a peak force of 21655.0 N. FIG. 20b shows force plotted against time for Test FH9357, with a peak force of 21655.0 N.

Figure 21A:
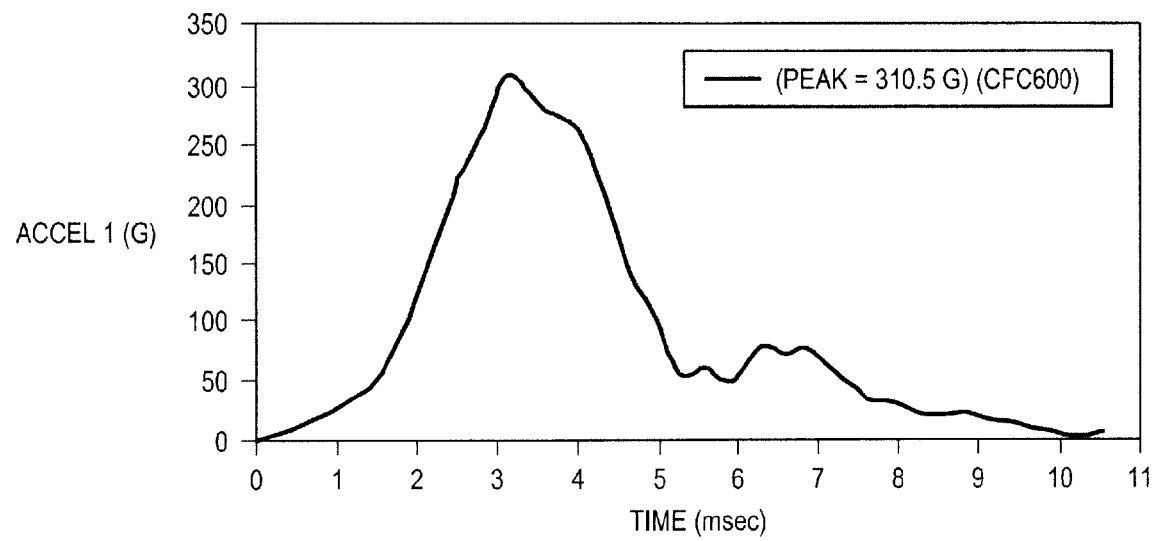
FIG. 21 shows acceleration plotted against time for Test FH9357, in an embodiment of the present invention.
Figure 21B:
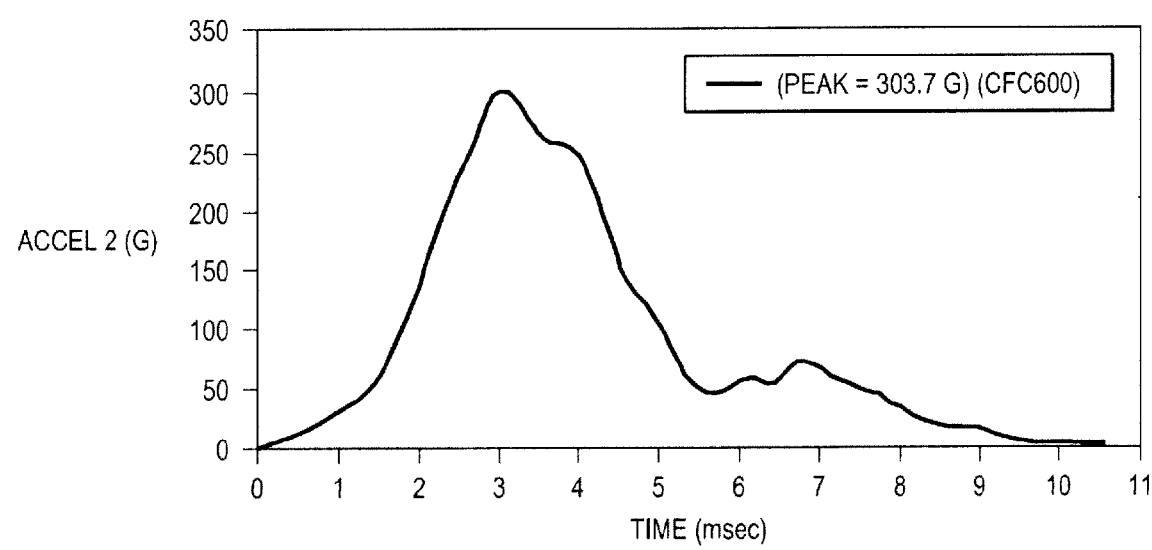

FIGS. 21a and 21b show acceleration plotted against time for Test FH9357. Accelerometer 1 (FIG. 21a) experienced a peak acceleration of 310.5 G, while Accelerometer 2 (FIG. 21b) experienced a peak acceleration of 303.7 G.

Figure 22A:
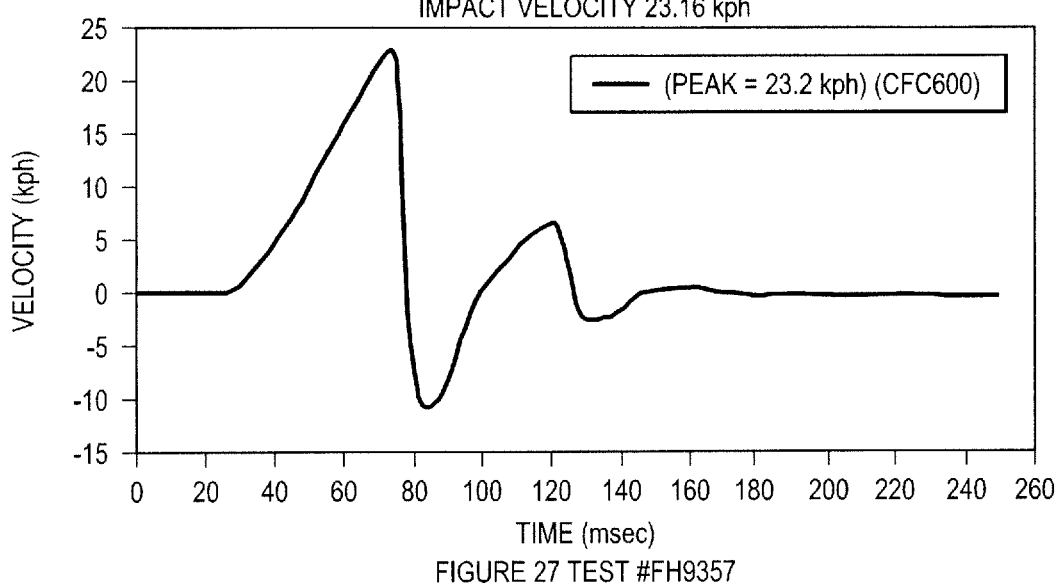
FIG. 22 shows velocity plotted against time and displacement plotted against time for Test FH9357, in an embodiment of the present invention.
Figure 22B:
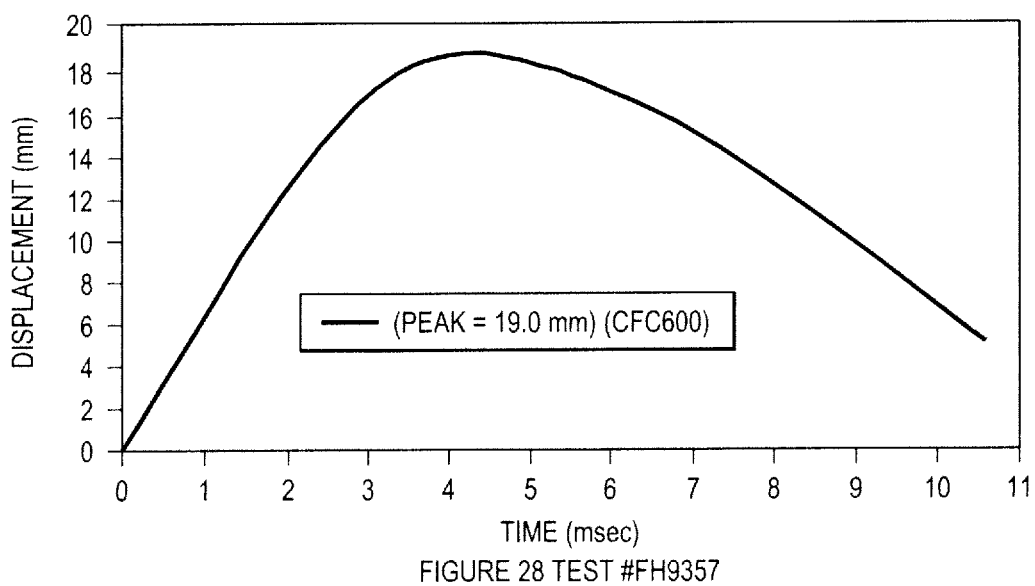

FIG. 22a shows velocity plotted against time for Test FH9357, with a peak velocity of 23.2 kph. FIG. 22b shows displacement plotted against time for Test FH9357, with a peak displacement of 19.0 mm.

Tables 1a and 1b show that in the test of FH9357 (Test No. 4), a peak velocity of 23.2 kph was reached. A HIC score of 2394.0 was calculated, and a HIC (d) score of 1972.5 was calculated.

Figure 23:
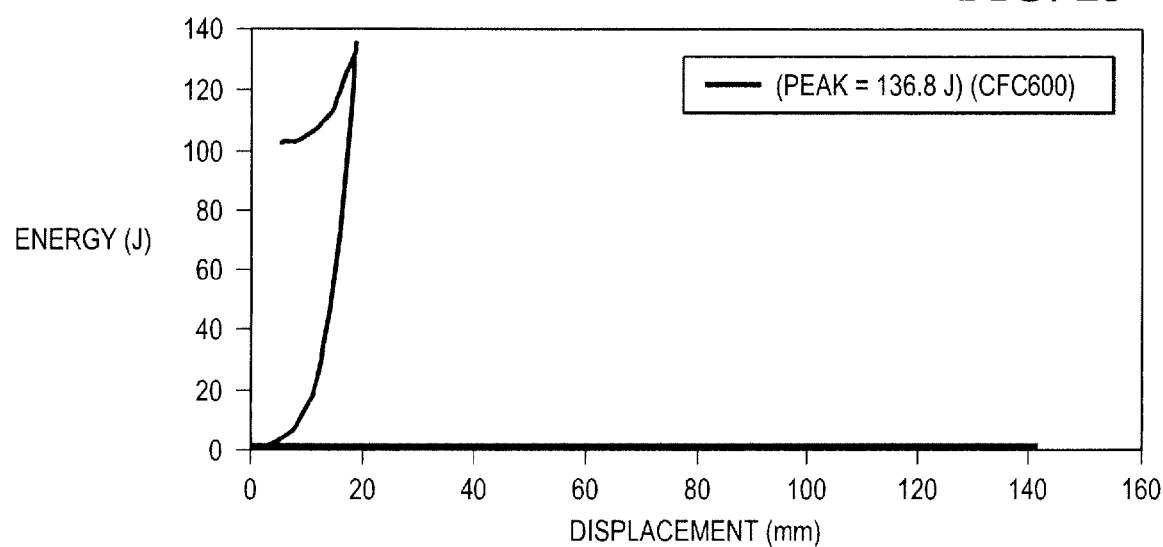
FIG. 23 shows energy plotted against displacement for Test FH9357, in an embodiment of the present invention.

FIG. 23 shows energy plotted against displacement for Test FH9357, with peak energy of 136.8 J.

FOR FMVSS 302: Flammability of Interior Materials, which is incorporated herein by reference, in its entirety.

EXAMPLE 12

Table 2 shows flammability testing results from several samples.

TABLE 2

Flammability test results of energy absorbing material in embodiments of the present invention, and control tests. FMVSS 302.

| MGA Test Number | Part Description | Length (mm) | Width (mm) | Thickness (mm) | Burn Distance (mm) | Burn Time (seconds) | Burn Rate (mm/min) | Met Req't |
|---|---|---|---|---|---|---|---|---|
| MA8853-E | E175 Polyurethane with polyurea coating | 230 | 100 | 9 | 52 | 300 | 10.4 | Yes |
| MA8853-F | E175 Polyurethane | 230 | 100 | 8 | 100 | 176 | 34.1 | Yes |
| MA8853-G | Expanded Polypropylene 1.8 pcf with Polyurea coating | 230 | 100 | 10 | 0 | 0 | SE/NBR | Yes |
| MA8853-H | Expanded Polypropylene 1.8 pcf | 230 | 100 | 10 | 100 | 95 | 63.2 | Yes |
| MA8853-I | Aluminum honey comb 15 psi with polyurea coating | 230 | 100 | 6 | 0 | 0 | SE/NBR | Yes |

SE/NBR = Self-Extinguishing/No Burn Rate

Figure 24A:
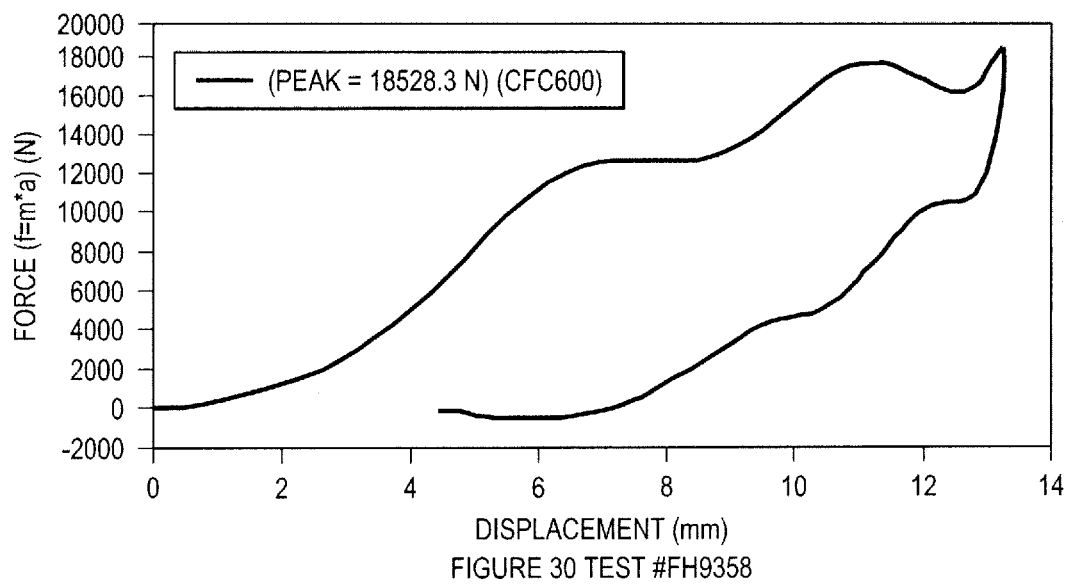
FIG. 24 shows force plotted against displacement and force plotted against time for Test FH9358, in an embodiment of the present invention.
Figure 24B:
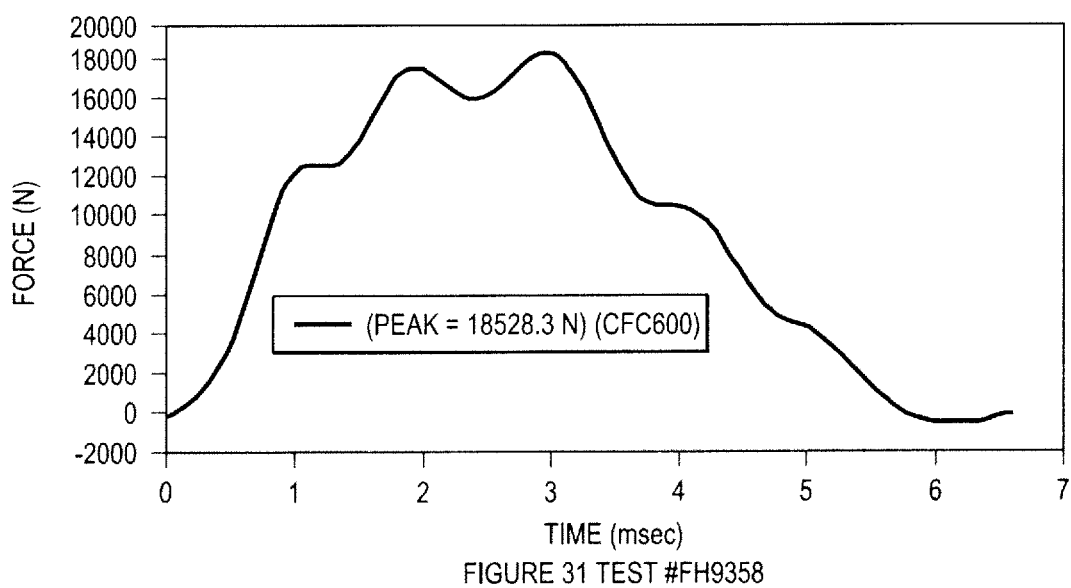

FIG. 24a shows force plotted against displacement for Test FH9358, with a peak force of 18528.3 N. FIG. 24b shows force plotted against time for Test FH9358, with a peak force of 18528.3 N.

Figure 25A:
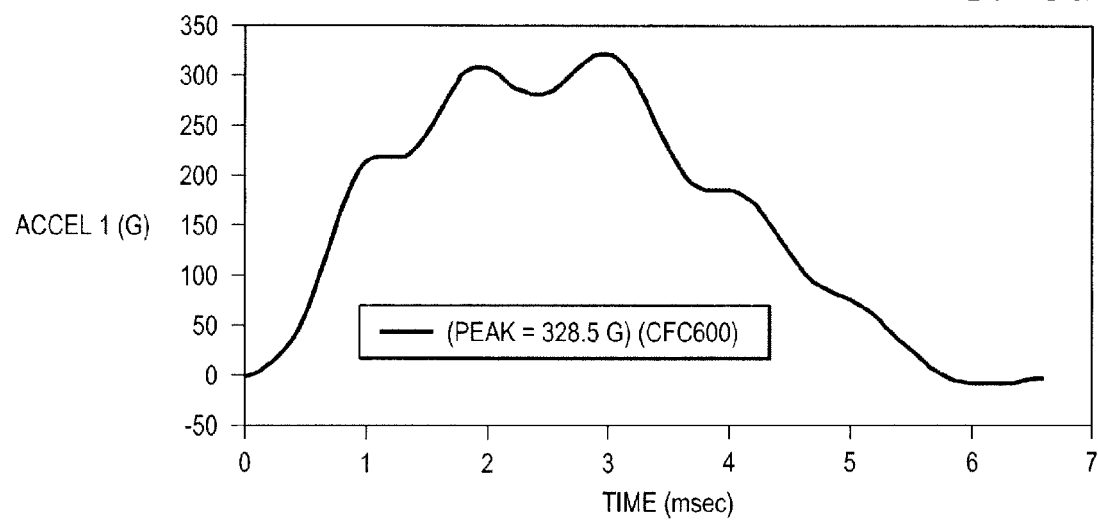
FIG. 25 show acceleration plotted against time for Test FH9358, in an embodiment of the present invention.
Figure 25B:
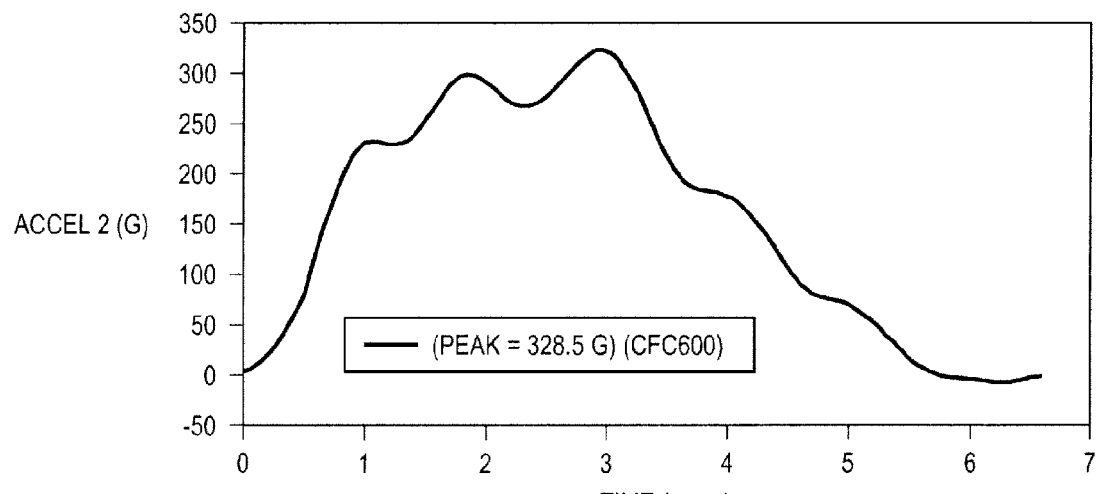

FIGS. 25a and 25b show acceleration plotted against time for Test FH9358. Accelerometer 1 (FIG. 25a) experienced a peak acceleration of 328.5 G, while Accelerometer 2 (FIG. 25b) experienced a peak acceleration of 328.5 G.

Figure 26A:
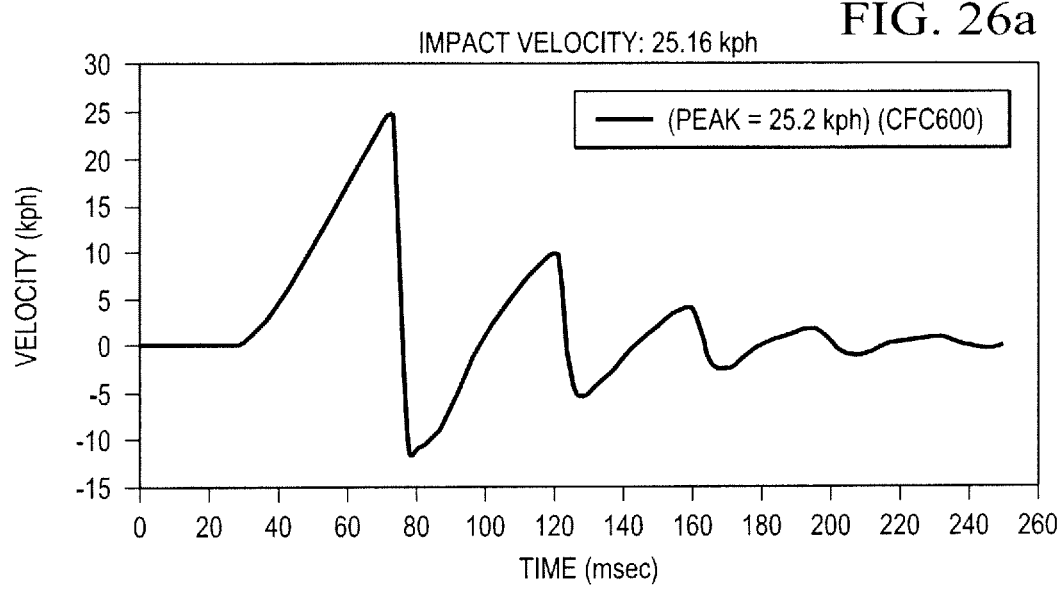
FIG. 26 shows velocity plotted against time and displacement plotted against time for Test FH9358, in an embodiment of the present invention.
Figure 26B:
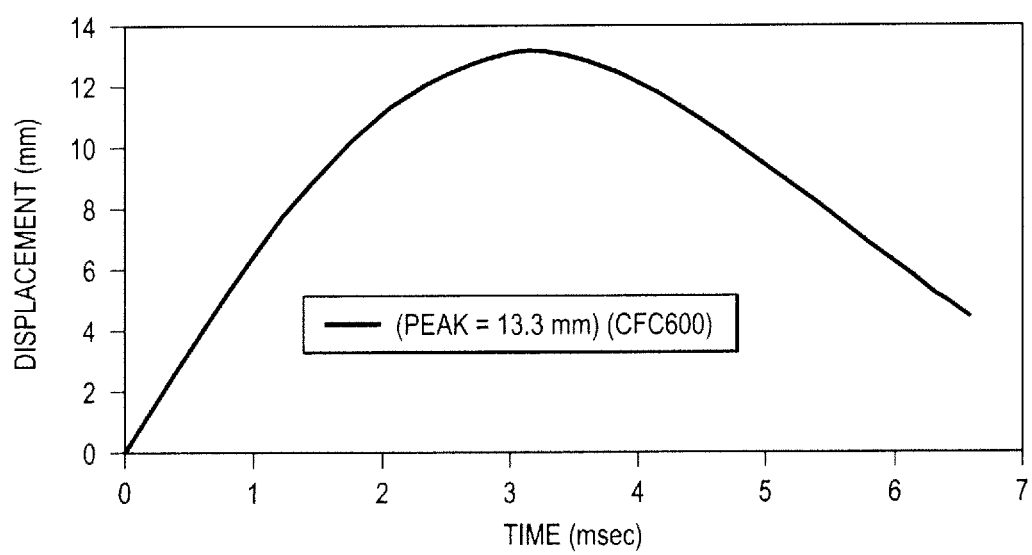

FIG. 26a shows velocity plotted against time for Test FH9358, with a peak velocity of 25.2 kph. FIG. 26b shows displacement plotted against time for Test FH9358, with a peak displacement of 13.3 mm.

Figure 27:
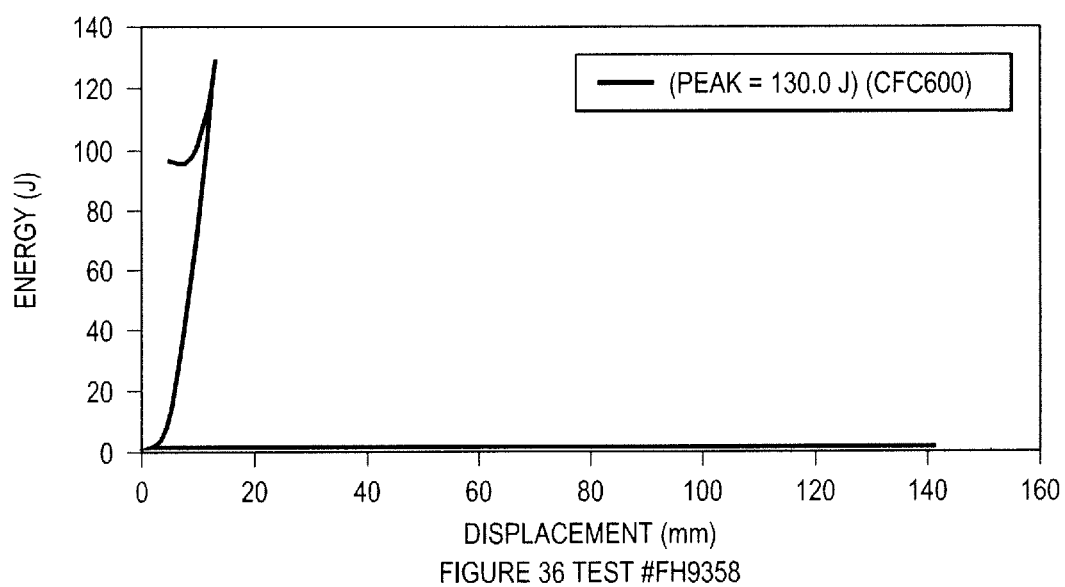
FIG. 27 shows energy plotted against displacement for Test FH9358, in an embodiment of the present invention.

FIG. 27 shows energy plotted against displacement for Test FH9358, with peak energy of 130.0 J.

Tables 1a and 1b show that in the test of FH9358 (Test No. 5), a peak velocity of 25.2 kph was reached. A HIC score of 3712.8 was calculated, and a HIC (d) score of 2967.6 was calculated.

EXAMPLE 10

Test FHTRIEA1 was conduced with aluminum honeycomb core material with 12 psi compression strength with TRI polyurea top coating over scrim cloth.

Figure 34:
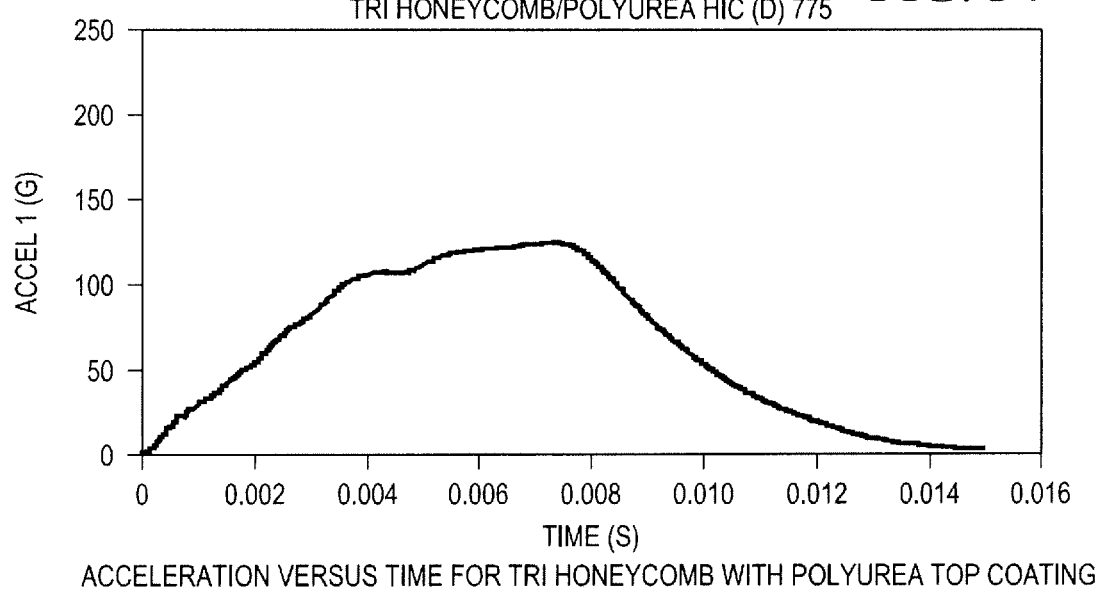
FIG. 34 shows acceleration plotted against time for TRI EA honeycomb polyurea top coating, in an embodiment of the present invention.

FIG. 34 show acceleration plotted against time for Test FHTRIEA1. HIC (d) value of 775.

EXAMPLE 11

Flammability testing was conducted in compliance with FMVSS 302 laboratory testing procedures. FMVSS 302 procedures are described in U.S. DEPARTMENT OF TRANSPORTATION, NATIONAL HIGHWAY TRAFFIC SAFETY ADMINISTRATION LABORATORY TEST PROCEDURE

EXAMPLE 13

Figure 28A:
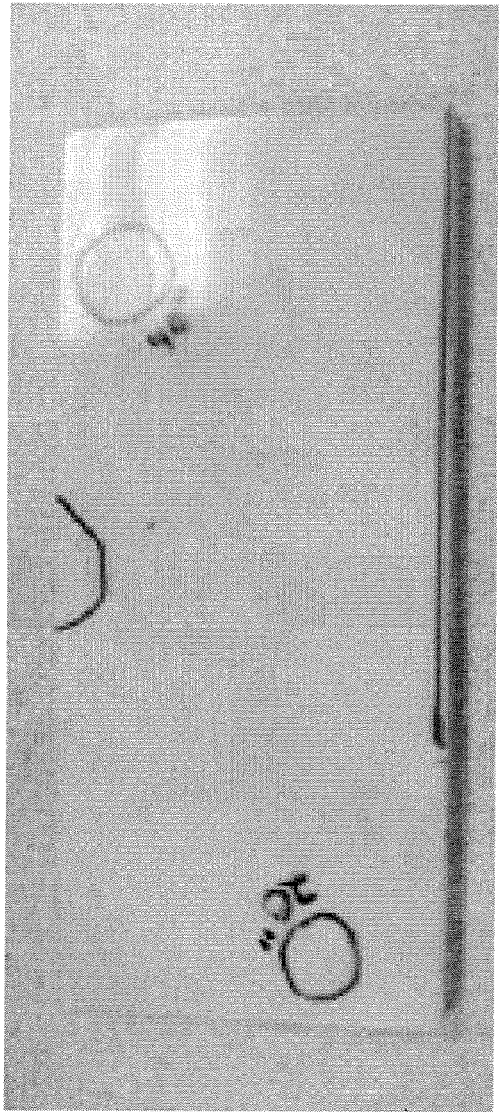
FIG. 28 shows a pre-test photograph and post-test photograph of sample MA8853-E subjected to burn test FMVSS 302.
Figure 28B:

FIG. 28a shows a pre-test photograph of sample MA8853-E. FIG. 28b shows a post-test photograph of sample MA8853-E.

Table 2 shows the details of the flammability testing of sample MA8853-E. The sample dimensions were 230 mm by 100 mm by 9 mm. The burn distance was 55 mm, and the burn time was 300 seconds for this sample, yielding a burn rate of 10.4 mm/min. This burn rate meets the requirements of FMVSS 302.

EXAMPLE 14

Figure 29A:
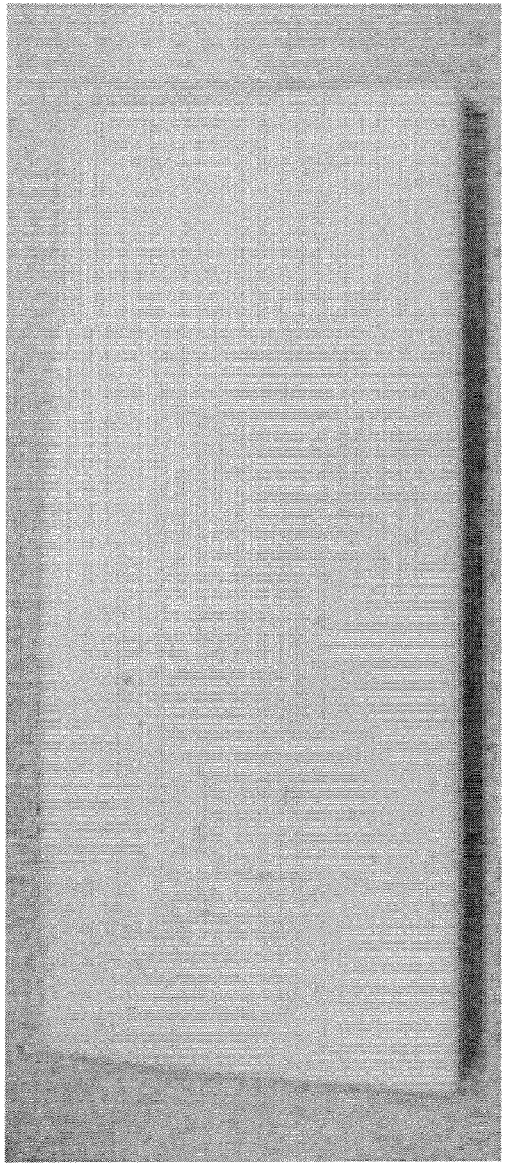
FIG. 29 shows a pre-test photograph and post-test photograph of sample MA8853-F subjected to burn test FMVSS 302.
Figure 29B:

FIG. 29a shows a pre-test photograph of sample MA8853-F. FIG. 29b shows a post-test photograph of sample MA8853-F.

Table 2 shows the details of the flammability testing of sample MA8853-F. The sample dimensions were 230 mm by 100 mm by 8 mm. The burn distance was 100 mm, and the burn time was 176 seconds for this sample, yielding a burn rate of 34.1 mm/min. This burn rate meets the requirements of FMVSS 302.

EXAMPLE 15

Figure 30A:
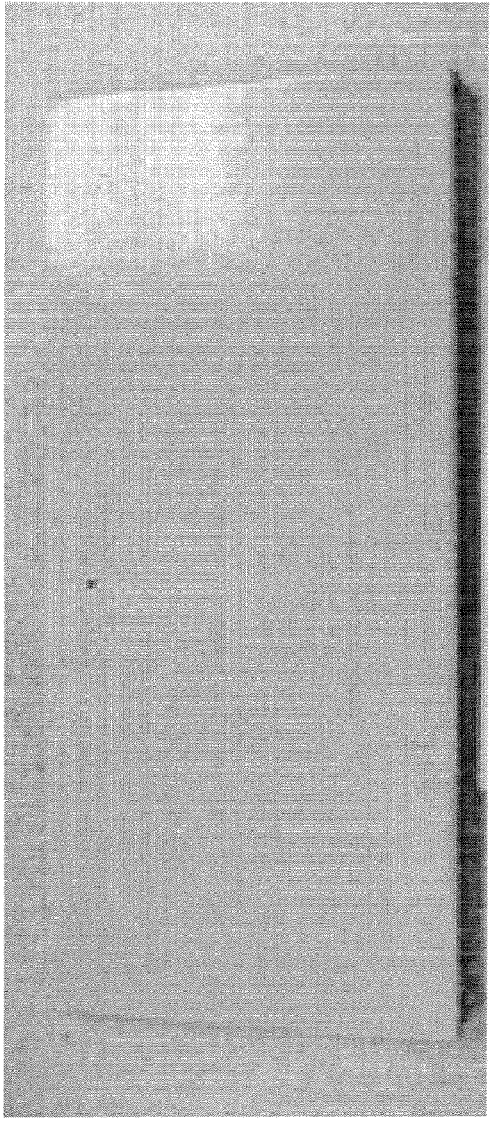
FIG. 30 shows a pre-test photograph and post-test photograph of sample MA8853-G subjected to burn test FMVSS 302.
Figure 30B:
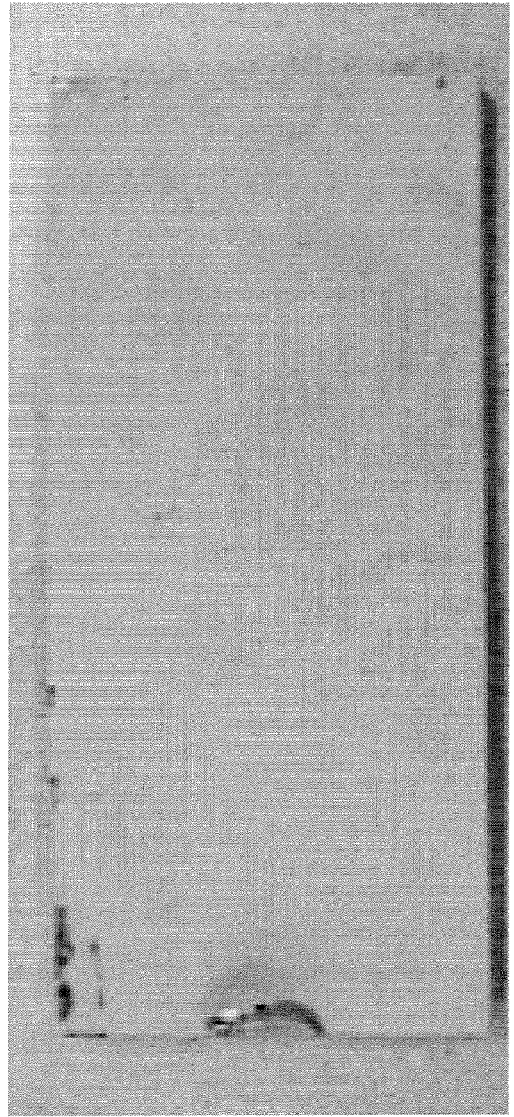

FIG. 30a shows a pre-test photograph of sample MA8853-G. FIG. 30b shows a post-test photograph of sample MA8853-G.

Table 2 shows the details of the flammability testing of sample MA8853-G. The sample dimensions were 230 mm by 100 mm by 10 mm. Sample MA8853-G was found to be self-extinguishing, and therefore no burn rate was available.

EXAMPLE 16

Figure 31A:
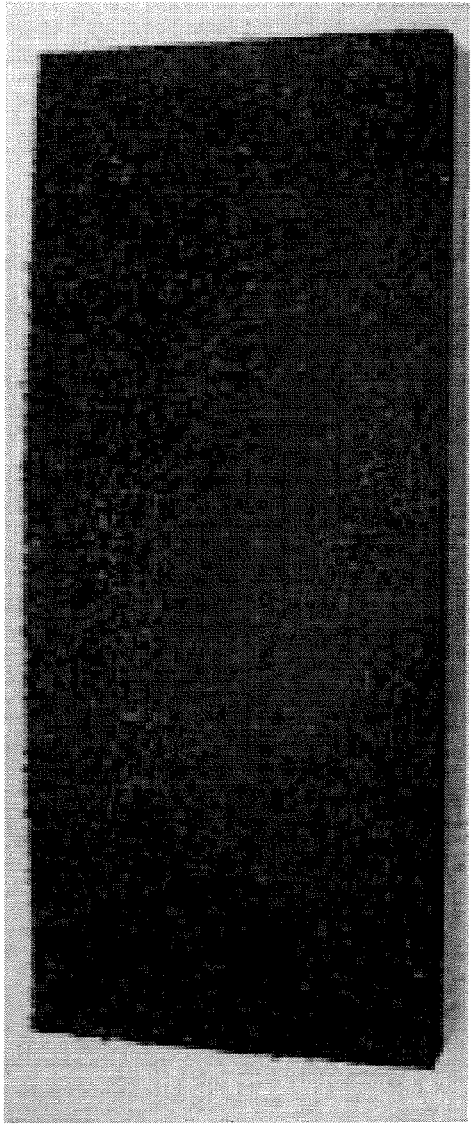
FIG. 31 shows a pre-test photograph and post-test photograph of sample MA8853-H subjected to burn test FMVSS 302.
Figure 31B:
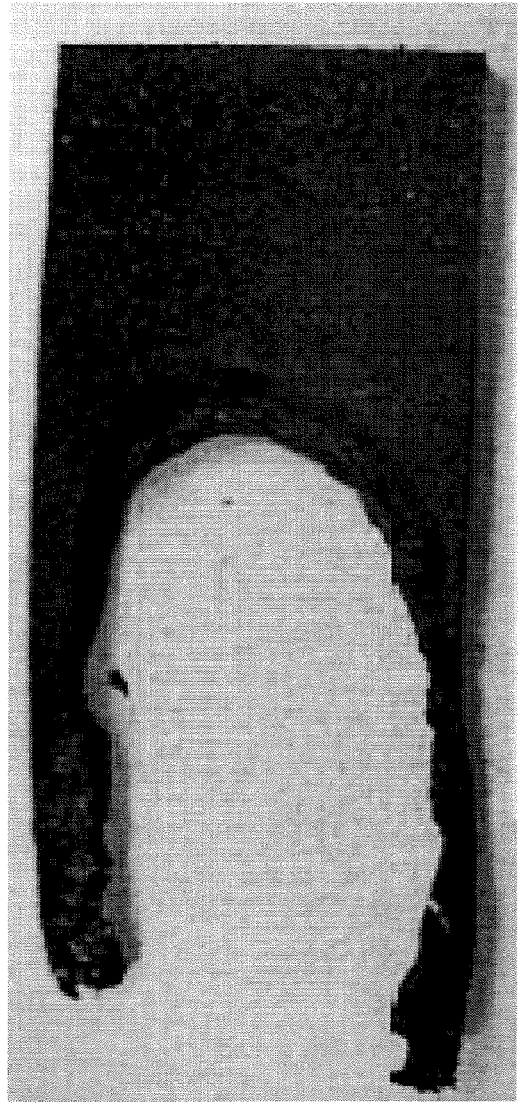

FIG. 31a shows a pre-test photograph of sample MA8853-H. FIG. 31b shows a post-test photograph of sample MA8853-H.

Table 2 shows the details for the flammability testing of sample MA8853-H. The sample dimensions were 230 mm by 100 mm by 10 mm. The burn distance was 100 mm, and the burn time was 95 seconds for this sample, yielding a burn rate of 63.2 mm/min. This burn rate meets the requirements of FMVSS 302.

EXAMPLE 17

Figure 32A:
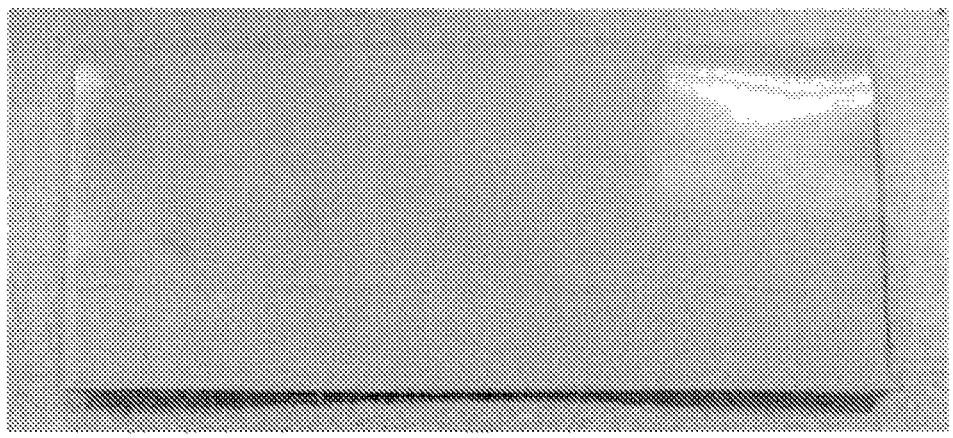
FIG. 32 shows a pre-test photograph and post-test photograph of sample MA8853-I subjected to burn test FMVSS 302.
Figure 32B:
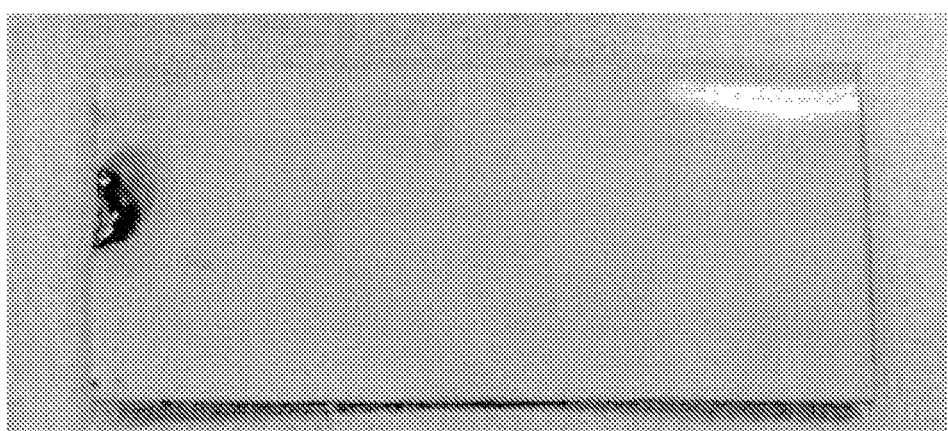

FIG. 32a shows a pre-test photograph of sample MA8853-I. FIG. 32b shows a post-test photograph of sample MA8853-I.

Table 2 shows the details for the flammability testing of sample MA8853-I. The sample dimensions were 230 mm by 100 mm by 6 mm. Sample MA8853-I was found to be self-extinguishing, and therefore no burn rate was available.

REFERENCES CITED

The following references, to the extent that they provide exemplary procedural or other details supplementary to those set forth herein, are specifically incorporated herein by reference.

U.S. PATENT DOCUMENTS

U.S. Patent Publication No. 2007/0114812 published on May 24, 2007, with Hunt listed as the inventor.

REFERENCES

Ralston, Dan *Advantages of a thermoplastic bumper Energy Absorber in a world without a 5 mph bumper requirement* (Abstract) SAE World Congress & Exhibition, April, 2009 Document No. 2009-01-0963

Carley, Michael Advancements in Expanded Polypropylene Foam Energy Management for Bumper Systems (Abstract) SAE World Congress & Exhibition, March, 2004 Document No. 2004-01-1700

Coatings of Polymers and Plastics (Materials Engineering, 21): Chapter 1, Chapter 5. Rose A. Ryntz (Editor), Philip V. Yaneff (Editor) Feb. 4, 2003

Bahei-El-Din, Yehia et al. A blast-tolerant sandwich plate design with a polyurea interlayer International Journal of Solids and Structures 43:25-26, pp. 7644-7658, December, 2006

Panduranga, Raghu et al. *Energy absorption performance of a Eco-Core—a syntactic foam* (Abstract) 48th AIAA/ASME/ASCE/AHS/ASC Structures, Structural Dynamics, and Materials Conference, Apr. 23, 2007-Apr. 26, 2007

U.S. DEPARTMENT OF TRANSPORTATION, NATIONAL HIGHWAY TRAFFIC SAFETY ADMINISTRATION LABORATORY TEST PROCEDURE FOR FMVSS 201: Occupant Protection in Interior Impact, TP-201-02, updated Mar. 3, 1989

U.S. DEPARTMENT OF TRANSPORTATION, NATIONAL HIGHWAY TRAFFIC SAFETY ADMINISTRATION LABORATORY TEST PROCEDURE FOR FMVSS 302: Flammability of Interior Materials, TP-302-03, updated Oct. 18, 1991

What is claimed:
1. An energy absorbing composition, comprising:
a) an expanded polypropylene;
b) a protective polyurea elastomeric coating material;
c) an adhesion promoter; and
d) a film adhesive;
wherein the energy absorbing composition has a thickness of equal to or greater than about 1.1 inches.

2. The energy absorbing composition of claim 1, wherein the protective elastomeric coating material is a polyurea compound formed from a first mixture and a second mixture, wherein the first mixture comprises approximately 65 wt % to 85 wt % polyoxypropylene diamine, the polyoxypropylene having a concentration of 60% to 100%, approximately 13 wt % to 23 wt % (diethyltoluenediamine), and approximately 7 wt % to 17 wt N,N'-dialkylamino-diphenylmethane, and a second mixture, the second mixture comprising: approximately 45.5 wt % to 55.5 wt % (diphenylmethane diisocyanate), 41.5 wt % to 51.5 wt % poly(tetramethylene ether) glycol, and <1 wt % to 8 wt % propylene carbonate.

3. The energy absorbing composition of claim 1, wherein the protective elastomeric coating material is a polyurea compound formed from a first mixture and a second mixture, wherein the first mixture comprises approximately 70.01 wt % polyoxypropylene diamine, the polyoxypropylene having a concentration of 60% to 100%, 17.99 wt % (diethyltoluenediamine), and 12.00 wt % N,N'-dialkylamino-diphenylmethane; and wherein the second mixture comprises 50.5 wt % (diphenylmethane diisocyanate), 46.5 wt % poly(tetramethylene ether)glycol, and 3.00 wt % propylene carbonate.

4. The energy absorbing composition of claim 1, wherein the adhesion promote is a liquid coating bonding compound.

5. The energy absorbing composition of claim 1, wherein the composition is capable of preventing deceleration of a 15 pound, 6.5 inch diameter headform traveling at a velocity of 15 miles per hour from exceeding 80G continuously for more than 3 milliseconds when mounted on a fixed surface.

6. The energy absorbing composition of claim 4, wherein the composition is capable of preventing rapid deceleration of a 15 pound, 6.5 inch diameter headform traveling at a velocity of 15 miles per hour from exceeding 80G continuously for more than 3 milliseconds when mounted on a fixed surface, after the headform has undergone one or more previous impacts.

7. The energy absorbing composition of claim 1, wherein the composition does not transmit a flame front across its surface at a rate of more than 4 inches per minute per test FMVSS 302.

8. The energy absorbing composition of claim 1, wherein the expanded polypropylene core has a density of 1.3 to 2.2 pounds per cubic foot.

9. An energy absorbing composition, comprising:
a) an aluminum honeycomb core material;
b) a protective polyurea elastomeric coating material;
c) an adhesion promoter; and
d) a film adhesive;
wherein the energy absorbing composition has a thickness of equal to or greater than about 1.1 inches.

10. The energy absorbing composition of claim 9, wherein the protective elastomeric coating material is a polyurea compound formed from a first mixture and a second mixture, wherein the first mixture comprises approximately 65 wt % to 85 wt % polyoxypropylene diamine, the polyoxypropylene having a concentration of 60% to 100%, approximately 13 wt % to 23 wt %-diethyltoluenediamine, and approximately 7 wt % to 17 wt Unilink 4200, and a second mixture, the second mixture comprising: approximately 45.5 wt % to 55.5 wt % (diphenylmethane diisocyanate), 41.5 wt % to 51.5 wt % poly(tetramethylene ether)glycol, and <1 wt % to 8 wt % propylene carbonate.

11. The energy absorbing composition of claim 9, wherein the protective elastomeric coating material is a polyurea compound formed from a first mixture and a second mixture, wherein the first mixture comprises approximately 70.01 wt % polyoxypropylene diamine, the polyoxypropylene having a concentration of 60% to 100%, 17.99 wt % diethyltoluenediamine, and 12.00 wt % Unilink 4200; and wherein the second mixture comprises 50.5 wt % (diphenylmethane diisocyanate), 46.5 wt % poly(tetramethylene ether)glycol, and 3.00 wt % propylene carbonate.

12. A method of protecting an occupant from injury, comprising: affixing an energy absorbing composition to the interior of a vehicle, wherein the energy absorbing material comprises an expanded polypropylene, a protective polyurea elastomeric coating material, an adhesion promoter, and a film adhesive, wherein the energy absorbing composition has a thickness of equal to or greater than about 1.1 inches.

13. The method of claim 12, wherein the protective elastomeric coating material is a polyurea compound formed from a first mixture and a second mixture, wherein the first mixture comprises approximately 70.01 wt % polyoxypropylene diamine, the polyoxypropylene having a concentration of 60% to 100%, 17.99 wt % (diethyltoluenediamine), and 12.00 wt. % N,N'-dialkylamino-diphenylmethane; and wherein the second mixture comprises 50.5 wt % (diphenylmethane diisocyanate), 46.5 wt % poly(tetramethylene ether) glycol, and 3.00 wt % propylene carbonate.

14. The method of claim 12, wherein the adhesion promoter is a liquid adhesive coating bonding compound.

15. The method of claim 12, wherein the energy absorbing composition is capable of preventing deceleration of a 15 pound, 6.5 inch diameter head form traveling at a velocity of 15 miles per hour from exceeding 80G continuously for more than 3 milliseconds when mounted on a fixed surface.

16. The method of claim 12, wherein the energy absorbing composition is capable of preventing deceleration of a 15 pound, 6.5 inch diameter head form traveling at a velocity of 15 miles per hour from exceeding 80G continuously for more than 3 milliseconds when mounted on a fixed surface, after one or more previous impacts.

17. The method of claim 12, wherein the energy absorbing composition does not transmit a flame front across its surface at a rate of more than 4 inches per minute as per FMVSS 302.

18. The method of claim 12, wherein the expanded polypropylene core has a density of 1.3 to 3.2 pounds per cubic foot.

* * * * *